(12) United States Patent
Nakamura et al.

(10) Patent No.: US 8,489,988 B2
(45) Date of Patent: Jul. 16, 2013

(54) IMAGE FORMING DEVICE, INFORMATION PROCESSING DEVICE, AND METHOD FOR OUTPUTTING A PLURALITY OF PRINT PREVIEW IMAGES WHEN DETECTING AN EVENT THAT MAKES PRODUCTION OF A PRINTED OUTPUT DIFFICULT

(75) Inventors: Mitsunori Nakamura, Amagasaki (JP); Hiroki Yoshida, Takatsuki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 12/851,649

(22) Filed: Aug. 6, 2010

(65) Prior Publication Data

US 2011/0038002 A1 Feb. 17, 2011

(30) Foreign Application Priority Data

Aug. 17, 2009 (JP) .................................. 2009-188187

(51) Int. Cl.
*G06F 15/00* (2006.01)
(52) U.S. Cl.
USPC ........... 715/274; 358/1.9; 358/1.15; 358/1.18
(58) Field of Classification Search
USPC .......................... 358/1.9, 1.15, 1.18; 715/274
See application file for complete search history.

(56) References Cited

U.S. PATENT DOCUMENTS

| 7,206,830 | B2 * | 4/2007 | Yamazaki ..................... 709/223 |
| 7,305,620 | B1 | 12/2007 | Nakajima et al. |
| 2005/0088668 | A1 * | 4/2005 | Sesek et al. ..................... 358/1.1 |
| 2006/0028663 | A1 | 2/2006 | Maeda |
| 2006/0221416 | A1 * | 10/2006 | Yamada ........................ 358/527 |
| 2009/0161148 | A1 | 6/2009 | Okada |
| 2010/0293458 | A1 * | 11/2010 | Rolleston et al. ............. 715/274 |

FOREIGN PATENT DOCUMENTS

| JP | 11-296335 A | 10/1999 |
| JP | 2002-152488 A | 5/2002 |
| JP | 2006-051609 | 2/2006 |
| JP | 2007-036345 | 2/2007 |
| JP | 2009-151672 | 7/2009 |

OTHER PUBLICATIONS

Office Action (Decision to Grant a Patent) dated May 31, 2011, issued in the corresponding Japanese Patent Application No. 2009-188187, and an English Translation thereof.

* cited by examiner

*Primary Examiner* — Peter K Huntsinger
(74) *Attorney, Agent, or Firm* — Buchanan Ingersoll & Rooney PC

(57) ABSTRACT

An image forming device is capable of making data communication with at least one printing device through a network. The image forming device comprises: a print job acquiring part for acquiring a print job created in response to user's instructions for printing; an image forming part for producing a printed output by executing the print job; an event detecting part for detecting occurrence of an event; and a print preview processing part for acquiring a first print preview image showing a printed output to be produced when the print job is executed in the image forming part, and a second print preview image showing a printed output to be produced when the print job is executed in the at least one printing device, and for outputting the first and second print preview images. The print preview processing part acquires and outputs the first and second print preview images when the event detecting part detects occurrence of the event.

21 Claims, 23 Drawing Sheets

FIG. 7

PRINTING DEVICE INFORMATION 150

| | | |
|---|---|---|
| 151 DEVICE NAME | PRINTING DEVICE A | |
| 152 ID | 123 | |
| 153 FEATURES INFORMATION | COLOR PROFILE | PROFILE A |
| | AVAILABLE FONT | FONT 1 FONT 2 FONT 3 |
| | | FONT 4 FONT 5 FONT 6 |
| | INTERNAL PROCESSING RESOLUTION | 1200dpi |
| | WAY OF IMAGE COMPRESSION | jpeg |
| | IMAGE COMPRESSION RATE | 75% |
| | CRITICAL MARGIN SIZE | TOP AND BOTTOM MARGINS: 10 mm<br>RIGHT AND LEFT MARGINS: 15 mm |
| | DATA FORMAT | PostScript |
| | ⋮ | ⋮ |
| 154 OPTIONAL INFORMATION | PUNCH | NO |
| | STAPLE | YES |
| | DUPLEX PRINTING | YES |
| | BOUND PRINTING | NO |
| | ⋮ | ⋮ |
| 155 PAPER INFORMATION | A3 | YES |
| | A4 | YES |
| | A5 | NO |
| | B3 | NO |
| | ⋮ | ⋮ |
| 156 | TONER | YES |

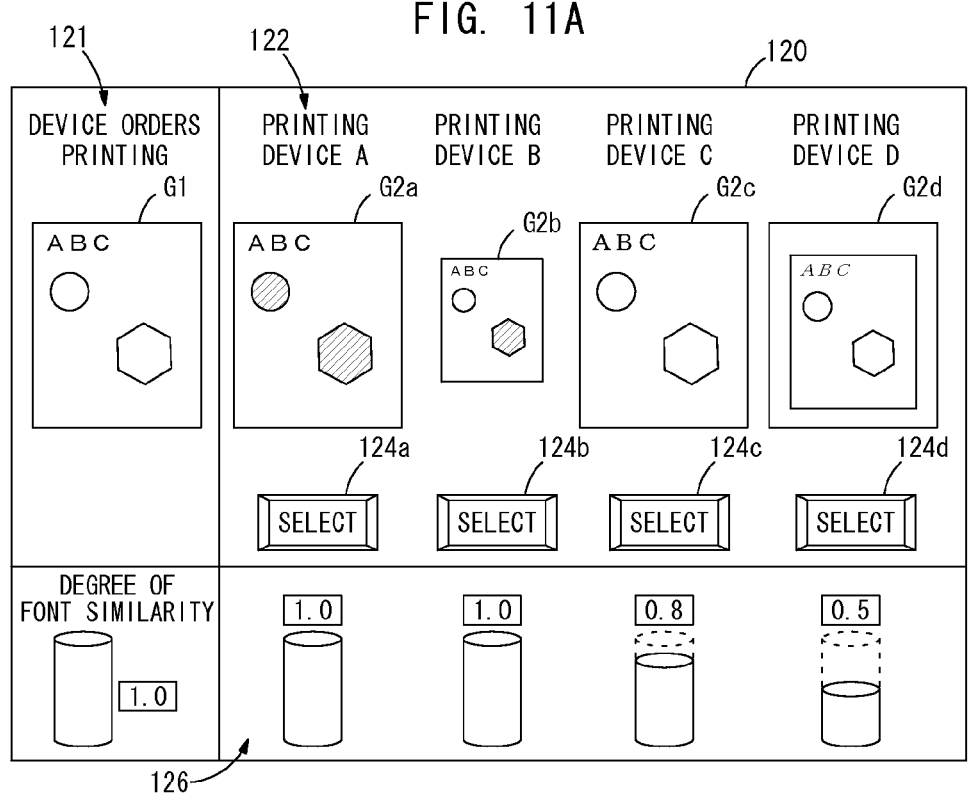
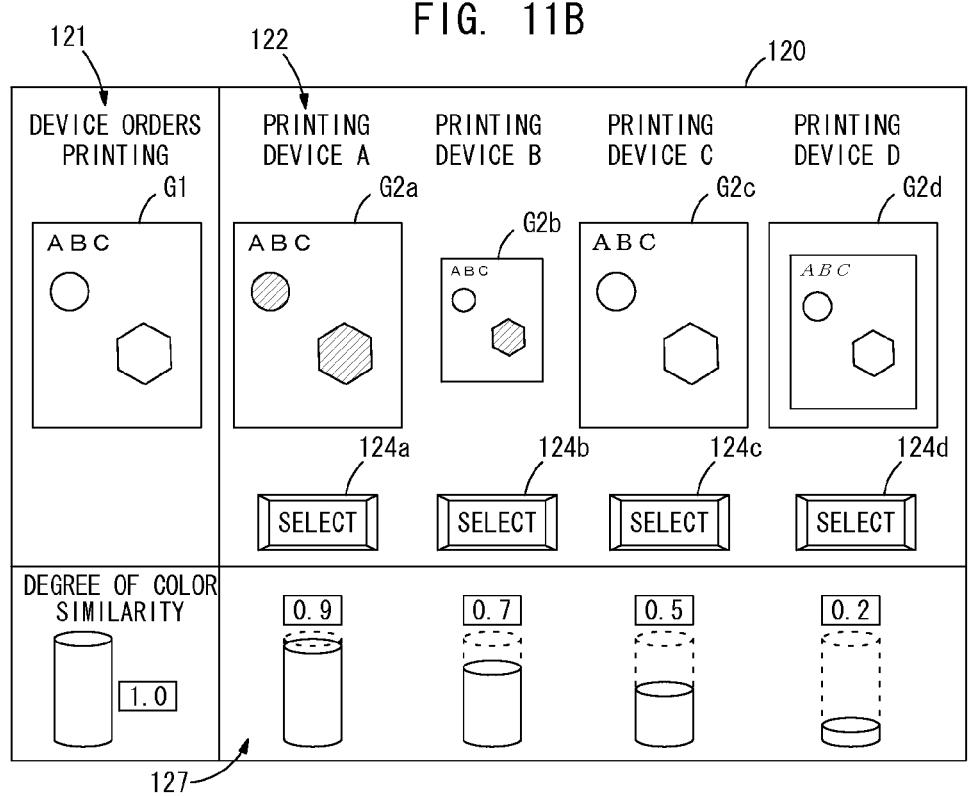

131: 
Date: Fri, 6 Feb 2009 11:08:23 +0900
From:"IMAGE FORMING DEVICE 1"
To:"USER A"
Subject:SELECTION OF ALTERNATIVE PRINTING DEVICE(JOB ID:4383)

132:
A PRINT JOB COULD NOT BE EXECUTED DUE TO SHEET SHORTAGE.
PLEASE REFER TO THE FOLLOWINGS FOR PRINTING DEVICES
THAT CAN RECEIVE THE PRINT JOB.
PLEASE FIND ATTACHED IMAGES FOR PRINT PREVIEW IMAGES SHOWING
PRINTED OUTPUTS TO BE PRODUCED BY THESE PRINTING DEVICES.

DEVICE ORDERS PRINTING(ID:007)   FILE NAME:MFP1.jpg
PRINTING DEVICE A(ID:123)   FILE NAME:printerA.jpg
PRINTING DEVICE B(ID:367)   FILE NAME:printerB.jpg
PRINTING DEVICE C(ID:472)   FILE NAME:printerC.jpg
PRINTING DEVICE D(ID:777)   FILE NAME:printerD.jpg WHEN YOU WISH TO TRANSFER THE PRINT JOB TO DIFFERENT PRINTING
DEVICE, PLEASE SEND A REPLY MESSAGE INCLUDING THE ID OF THIS
PRINTING DEVICE RECITED IN THE BODY OF THE REPLY MESSAGE.

133:
ATTACHED FILES : MFP1.jpg, printerA.jpg, printerB.jpg,
               printerC.jpg, printerD.jpg

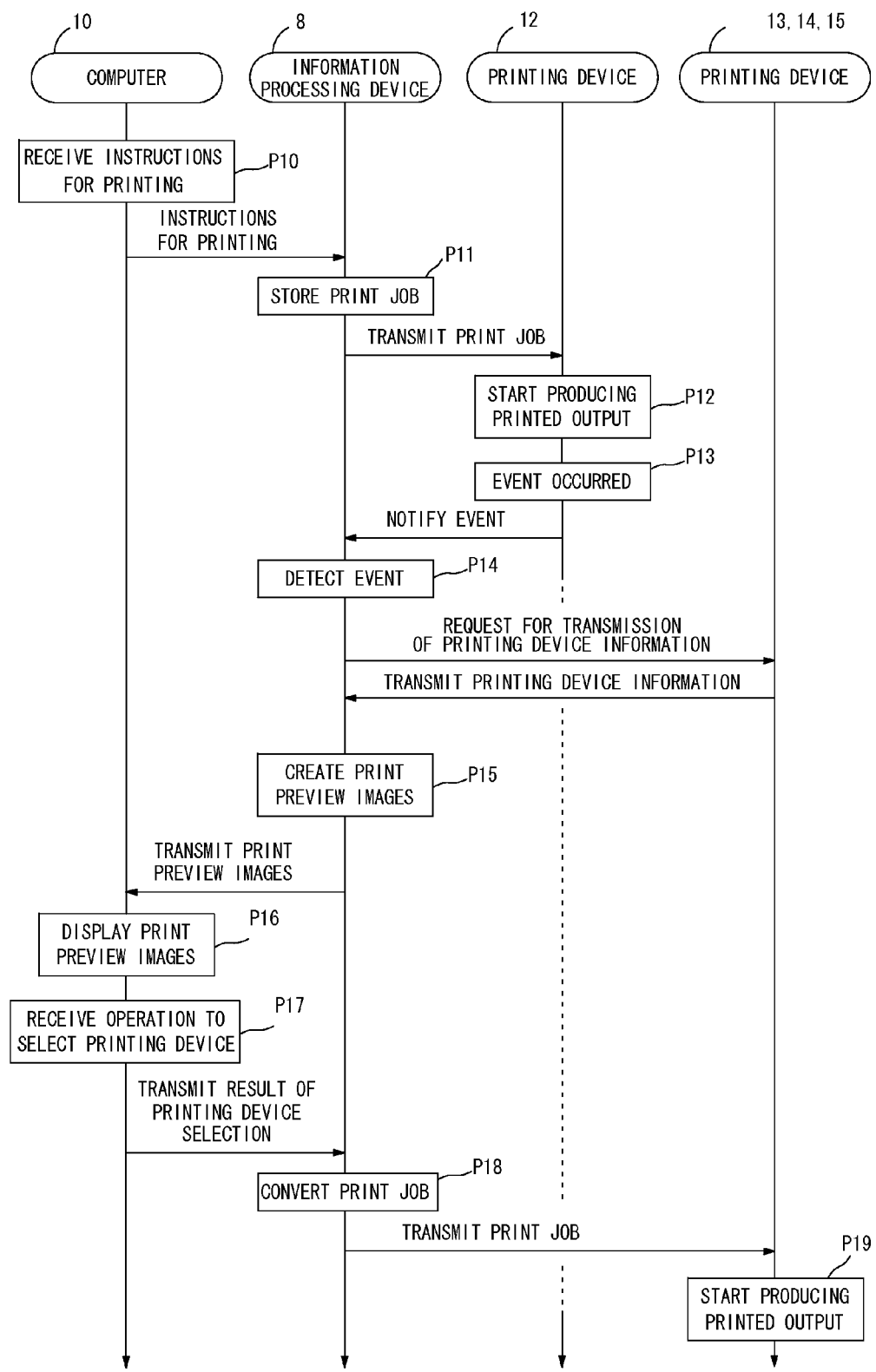

IMAGE FORMING DEVICE, INFORMATION PROCESSING DEVICE, AND METHOD FOR OUTPUTTING A PLURALITY OF PRINT PREVIEW IMAGES WHEN DETECTING AN EVENT THAT MAKES PRODUCTION OF A PRINTED OUTPUT DIFFICULT

This application is based on the application No. 2009-188187 filed in Japan, the contents of which are hereby incorporated by reference.

BACKGROUND OF THE INVENTION

1. Field of the Invention

The present invention relates to an image forming device, an information processing device, and a print preview processing method. The present invention more specifically relates to a technique of processing a print preview image applied when a print job is executed.

2. Description of the Background Art

Widely known conventional image forming devices that execute print jobs in response to user's instructions for printing and produce printed outputs include devices such as those disclosed for example in Japanese Patent Application Laid-Open Nos. JP1999-296335 A (called patent document 1) and JP2002-152488 A (called patent document 2). The image forming devices disclosed therein have a function to create a print preview image before producing a printed output, and displays the created print preview image on a device such as a monitor.

According to the technique disclosed for example in patent documents 1 and 2, spool data is converted to data of an image as a print preview image. When the image data is edited, the edited image data is converted again to spool data, so that a result of the edition is reflected in a printed output.

An image forming device is connected through a network to multiple printing devices in a manner that allows data communication therebetween. It is assumed that an error such as toner shortage or sheet shortage is occurred in the image forming device when a print job is executed therein to produce a printed output in response to user's instructions for printing, thereby making execution of the print job impossible. In this case, what the conventional image forming devices can normally do is only to display error information indicating that making a printed output is not possible to the user. In response, the user should find which one of the other printing devices is available, and give instructions for printing again to the printing device determined to be available. This troublesome operation places a burden on the user.

Both the techniques disclosed in patent documents 1 and 2 allow a result of a printed output to be displayed in advance as a print preview image. However, these techniques fail to reduce the burden to be placed on the user in the case of occurrence of error in the image forming device.

The conventional image forming devices include such a device as that automatically transmits a print job to another printing device when an error is occurred during execution of the print job. However, this conventional image forming device simply transfers the print job to another printing device. So, when the printing device received the transferred print job executes the print job to produce a printed output, the condition of finishing such as a font, a color or a margin of the produced printed output may differ from that of a printed output to be produced by the originally intended image forming device with execution of the print job. In this case, the condition of the produced printed output desired by a user may not be achieved.

This problem should be considered seriously, especially for the reason that the user finds the fact that the produced printed output fails to satisfy his desire after the printing device received the transferred print job executes the print job. This requires the user to give instructions for printing again to obtain a desired printed output, while making the printed output produced by the printing device that received the transferred print job to go to waste.

SUMMARY OF THE INVENTION

The present invention has been made to solve the above-described problems. It is an object of the present invention to provide an image forming device, an information processing device, and a print preview processing method that realize the followings when an event including occurrence of an error such as toner shortage and sheet shortage is occurred in the image forming device. First, a burden to be placed on a user in order to obtain a printed output is reduced. Second, a printed output satisfying a user is efficiently provided while no printed output is forced to go to waste.

First, the present invention is directed to an image forming device capable of making data communication with at least one printing device through a network. According to one aspect of the image forming device, the device comprises: a print job acquiring part for acquiring a print job created in response to user's instructions for printing; an image forming part for producing a printed output by executing the print job; an event detecting part for detecting occurrence of an event; and a print preview processing part for acquiring a first print preview image showing a printed output to be produced when the print job is executed in the image forming part, and a second print preview image showing a printed output to be produced when the print job is executed in the at least one printing device, and for outputting the first and second print preview images. The print preview processing part acquires and outputs the first and second print preview images when the event detecting part detects occurrence of the event.

Second, the present invention is directed to an information processing device connected through a network to multiple printing devices in a manner that allows data communication therebetween. The information processing device receives a print job created in response to user's instructions for printing, and transmits the print job to a printing device selected from the multiple printing devices and designated by the instructions for printing. According to one aspect of the information processing device, the device comprises: an event detecting part for detecting occurrence of an event that makes production of a printed output difficult in the designated printing device; and a print preview processing part for acquiring a first print preview image showing a printed output to be produced when the print job is executed in the designated printing device, and a second print preview image showing a printed output to be produced when the print job is executed in at least one printing device different from the designated printing device, and for outputting the first and second print preview images. The print preview processing part acquires and outputs the first and second print preview images when the event detecting part detects occurrence of the event.

Third, the present invention is directed to a print preview processing method. According to one aspect of the print preview processing method, the method is employed in an image forming device capable of making data communication with at least one printing device through a network. The method comprises the steps of: (a) acquiring a print job created in response to user's instructions for printing; (b) detecting occurrence of an event in the image forming device; (c) acquiring a first print preview image showing a printed output to be produced when the print job is executed in the image forming device, and a second print preview image showing a printed output to be produced when the print job is executed in the at least one printing device; and (d) outputting the first and second print preview images.

According to another aspect of the print preview processing method, the method is employed in an image forming system in which multiple printing devices are connected through a network in a manner that allows data communication therebetween. The image forming system receives a print job created in response to user's instructions for printing, and transmits the print job to a printing device selected from the multiple printing devices and designated by the instructions for printing. The method comprises the steps of: (a) detecting occurrence of an event in the designated printing device, the event making production of a printed output difficult in the designated printing device; (b) acquiring a first print preview image showing a printed output to be produced when the print job is executed in the designated printing device, and a second print preview image showing a printed output to be produced when the print job is executed in at least one printing device different from the designated printing device when occurrence of the event is detected; and (c) outputting the first and second print preview images.

BRIEF DESCRIPTION OF THE DRAWINGS

FIG. 7 shows an example of printing device information;

FIGS. 10A, 10B, 11A and 11B each shows an example of a print preview screen;

FIG. 14 shows an example of an e-mail message to which first and second print preview images are attached;

FIG. 23 shows the sequence of processes of the third preferred embodiment in order for an information processing device to transfer a print job.

DESCRIPTION OF THE PREFERRED EMBODIMENTS

Figure 1:
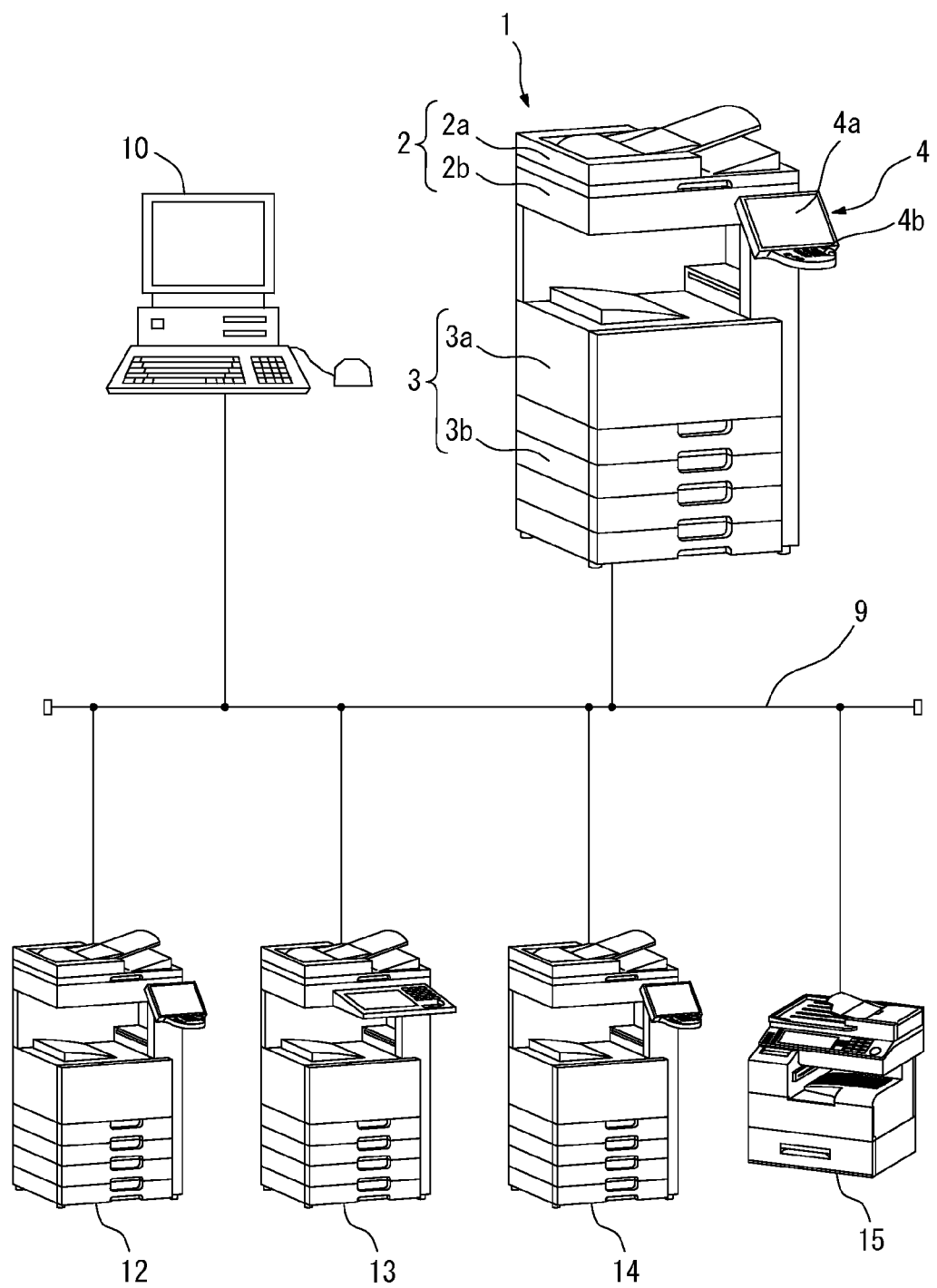
FIG. 1 shows an exemplary configuration of an image forming system of a first preferred embodiment of the present invention.

Preferred embodiments of the present invention are described in detail below with reference to figures. In the description given below, those elements which are shared in common among the preferred embodiments are represented by the same reference numerals, and these elements are not discussed repeatedly for the same description.

(First Preferred Embodiment)

FIG. 1 shows an exemplary configuration of an image forming system of a first preferred embodiment of the present invention. The image forming system includes: an image forming device 1 identified by a name such as a complex device or an MFP (multifunction peripheral); a computer 10 formed from a device such as a personal computer (PC); and multiple printing devices 12, 13, 14 and 15 that are provided separately from the image forming device 1. The image forming device 1, the computer 10, and the printing devices 12, 13, 14 and 15 are connected to each other through a network 9 in a manner that allows data communication therebetween. While the four printing devices 12, 13, 14 and 15 are shown to be connected to the network 9 in the first preferred embodiment, the number of printing devices is not limited to four.

The image forming device 1 of the first preferred embodiment has several functions including a print function, a copy function, a scanner function, and a FAX function. However, the image forming device 1 is not limited to a device having these functions, but may be a device with at least print function in the first preferred embodiment. More specifically, the image forming device 1 of the first preferred embodiment is at least required to execute a print job.

The image forming device 1 is provided with an image reader 2 at the upper part of a device body. The image reader 2 includes an automatic document feeder (ADF) 2a and a scanning section 2b. The image reader 2 is put into operation to read the image of a document, for example, when a user gives instructions for execution of a copy job, a scanner job or a FAX transmission job. At this time, the ADF 2a feeds each page of the document with multiple pages one by one to the scanning section 2b, and the scanning section 2b reads each page of the multiple pages fed from the ADF 2a one by one, thereby automatically and continuously reading the pages of the document.

The image forming device 1 is provided with an image forming unit 3 provided at the lower part of the device body. The image forming unit 3 includes a printing section 3a and a sheet feeding section 3b. The image forming unit 3 is put into operation to produce a printed output, for example, when a user gives instructions for execution of a print job, a copy job or a FAX receiving job. The sheet feeding section 3b holds multiple output sheets therein, and picks output sheets up one by one and feeds the sheets to the printing section 3a for producing a printed output. The printing section 3a transfers toner onto an output sheet fed from the sheet feeding section 3b, thereby forming an image on the output sheet.

The image forming device 1 is also provided with an operational panel 4 operable by a user on the front side of the image reader 2. The operational panel 4 includes a display section 4a formed from a device such as a liquid crystal display on which various types of information are displayed to a user, and an input section 4b with a plurality of operation keys with which the user makes entries. The operation keys constituting the input section 4b include both touch panel keys arranged on the screen of the display section 4a, and push-button keys arranged around the display section 4a.

Although not shown in FIG. 1, the image forming device 1 may also be provided with a post-processing unit responsible for post-processing such as stapling, punching and saddle stitching. The post-processing is performed with multiple printed sheets being bundled after forming the image in the image forming unit 3. This post-processing unit is an optional unit that can be added to the image forming device 1. So, the image forming device 1 to which such optional unit is added is capable of performing post-processing necessitated for execution of a print job.

Figure 2:
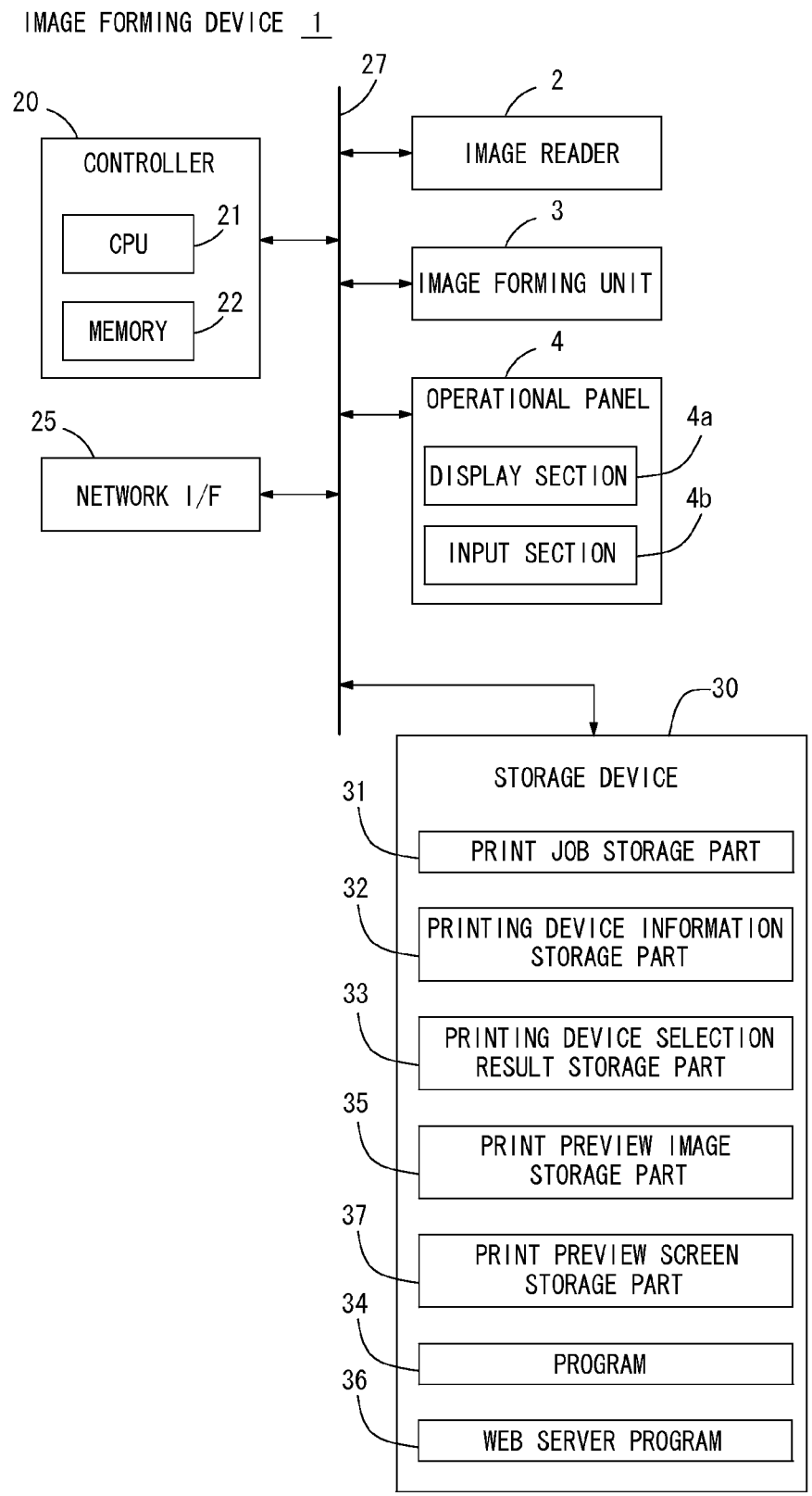
FIG. 2 is a block diagram showing an exemplary hardware configuration of the image forming device.

FIG. 2 is a block diagram showing an exemplary hardware configuration of the image forming device 1. As shown in FIG. 2, the image forming device 1 includes, in addition to the image reader 2, the image forming unit 3 and the operational panel 4 already described, a controller 20, a network interface 25, and a storage device 30 that are connected to each other through a data bus 27. The controller 20 includes a CPU 21 and a memory 22. The CPU 21 reads and executes a program 34 stored in the storage device 30, so that the CPU 21 becomes operative to control each part. The memory 22 stores data therein such as temporary data when the CPU 21 executes the program 34.

The CPU 21 reads and executes a WEB server program 36 stored in the storage device 30, thereby causing the image forming device 1 to function as a Web server. As an example, when a Web browser program runs in the computer 10, the computer 10 in this state makes access to the image forming device 1. The image forming device 1 with the Web server function then outputs a screen that can be displayed by using the Web browser program to the computer 10.

The network interface 25 realizes data communication with the computer 10, and with the printing devices 12, 13, 14 and 15 through the network 9.

The storage device 30 is formed from a nonvolatile storage device such as a hard disk drive. The storage device 30 stores therein the program 34 and the Web server program 36 installed in advance on the image forming device 1. The storage device 30 includes: a print job storage part 31 in which a print job received from the computer 10 is stored; a printing device information storage part 32 in which printing device information 150 received from each of the printing devices 12, 13, 14 and 15 is stored; a printing device selection result storage part 33 in which a signal showing a result of printing device selection received from the computer 10 is stored; a print preview image storage unit 35 in which a print preview image created by the image forming device 1 is stored; and a print preview screen storage part 37 in which a print preview screen with multiple print preview images arranged thereon is stored.

Figure 3:
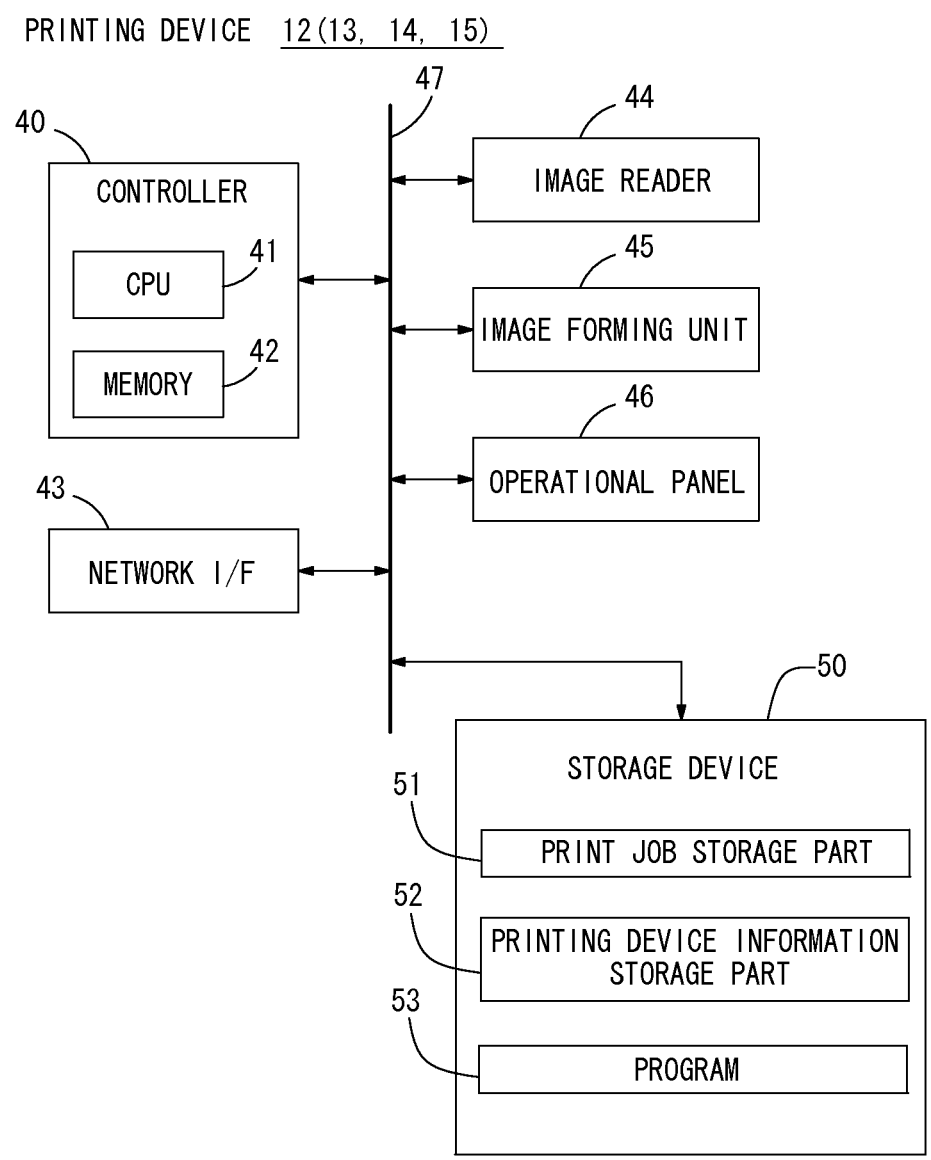
FIG. 3 is a block diagram showing an exemplary hardware configuration of a printing device.

Each of the printing devices 12, 13, 14 and 15 has at least a print function, and produce a printed output by executing a print job received through the network 9. FIG. 3 is a block diagram showing an exemplary hardware configuration of each of the printing devices 12, 13, 14 and 15. As shown in FIG. 3, the printing devices 12, 13, 14 and 15 each includes an image reader 44, an image forming unit 45, an operational panel 46, a network interface 43, a controller 40, and a storage device 50 that are connected to each other through a data bus 47.

The controller 40 includes a CPU 41 and a memory 42. The CPU 41 reads and executes a program 53 stored in the storage device 50, so that the CPU 41 becomes operative to control each part. The memory 42 stores data therein such as temporary data when the CPU 41 executes the program 53.

The network interface 43 realizes data communication with the image forming device 1 through the network 9.

The storage device 50 is formed from a nonvolatile storage device such as a hard disk drive. The storage device 50 stores therein the program 53 installed in advance on the respective printing devices 12, 13, 14 and 15. The storage device 50 includes a print job storage unit 51 in which a print job transferred from the image forming device 1 is stored, and a printing device information storage unit 52 in which printing device information 150 in reference to the corresponding one of the printing devices 12, 13, 14 and 15 is stored. The printing device information 150 indicates the features or conditions of the printing device 12, 13, 14 or 15, and the details of which is described later.

Figure 4:
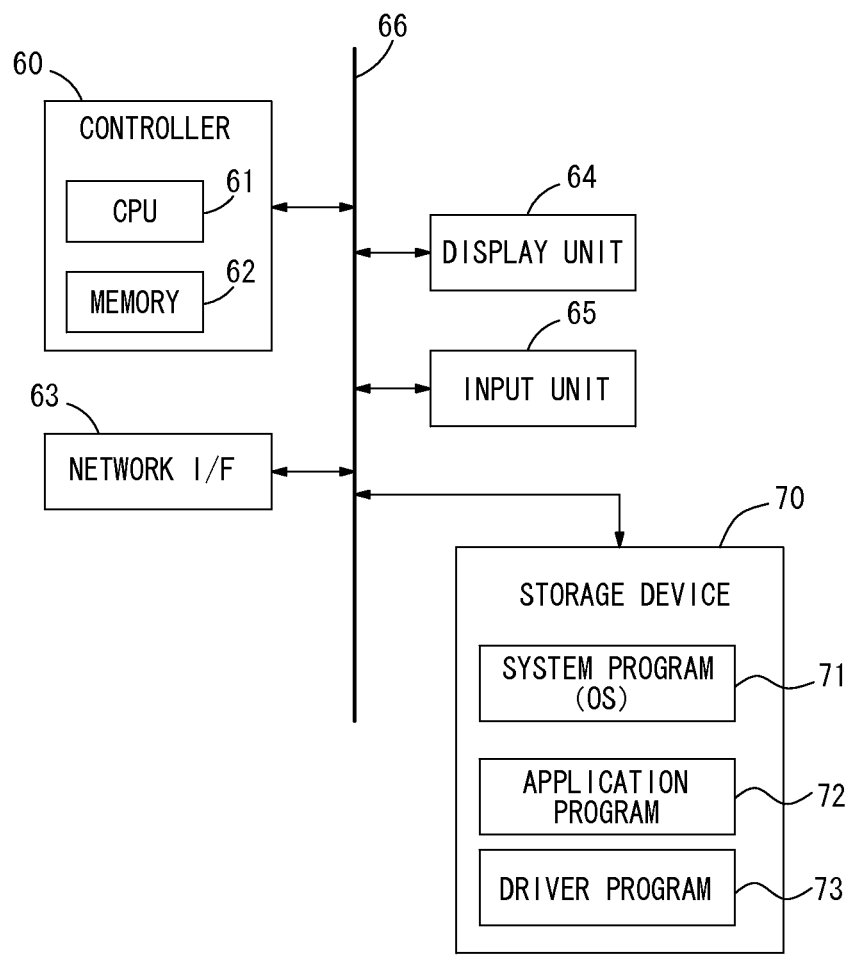
FIG. 4 is a block diagram showing an exemplary hardware configuration of a computer.

The computer 10 gives instructions for printing to the image forming device 1. FIG. 4 is a block diagram showing an exemplary hardware configuration of the computer 10. As shown in FIG. 4, the computer 10 includes a display unit 64, an input unit 65, a network interface 63, a controller 60, and a storage device 70 that are connected to each other through a data bus 66. The display unit 64 is formed from a device such as a liquid crystal display for displaying various types of information to a user of the computer 10. An image transmitted from the image forming device 1, a screen, and others, for example, are displayed on the display unit 64, so that the user can see the details on the display unit 64. The input unit 65 is formed, for example, from a keyboard and a mouse, and through which the user makes entries.

The controller 60 is responsible for control of each part of the computer 10, and for various computations. The controller 60 includes a CPU 61 and a memory 62. The CPU 61 reads and executes programs 71, 72 and 73 stored in the storage device 70, so that the CPU 61 becomes operative to control each part, and to perform various computations. The memory 62 stores data therein such as temporary data generated as a result, for example, of a computation performed by the CPU 61.

The network interface 63 realizes data communication with the image forming device 1 through the network 9.

The storage device 70 is formed from a nonvolatile storage device such as a hard disk drive. The storage device 70 stores therein the programs 71, 72 and 73 installed in advance on the computer 10. The programs 71, 72 and 73 stored in the storage device 70 are respectively a system program functioning as an operating system, an application program used to create data such as document data in response to an editing operation input through the input unit 65, and a driver program (printer driver) that is activated in response to instructions to produce a printed output of document data given during execution of the application program 72. The driver program 73 is provided to give instructions for printing, for example, to the image forming device 1.

Accordingly, the system program 71 is activated when a user turns the computer 10 on. The application program 72 is thereafter activated to allow creation of document data. When instructions to produce a printed output of document data are given from the user through the input unit 65, the controller 60 activates the driver program 73. After activating the driver program 73, the controller 60 creates a print job from the document data that can be executed by the image forming device 1 and transmits instructions for printing including the created print job to the image forming device 1. The driver program 73 continues to run in the controller 60 until the image forming device 1 completes execution of the received print job. Then, the driver program 73 causes the controller 60 to function to allow data communication between the image forming device 1 and the computer 10 through the network 9.

In response to the instructions for printing received from the computer 10, the image forming device 1 executes the print job received together with the instructions to start producing a printed output. The image forming device 1 cannot execute the print job when an error such as sheet shortage, toner shortage, account balance shortage, or stapler shortage is occurred at this time in the image forming device 1. It is assumed as an example that the print job is to make images formed on ten output sheets while the sheet feeding section 3b holds only one output sheet therein. In this case, the print job is stopped after the first sheet of printed output is produced, and execution of the print job cannot be continued any longer. As another example, when the sheet feeding section 3b holds no output sheet therein at the point of start of the print job, the image forming device 1 cannot start execution of the print job. These apply to the case of toner shortage or stapler shortage as well. It is assumed as a further example that an account is managed for each user or for each section to which the user belongs. When account balance shortage occurs before or after start of execution of the print job in this case, execution of the print job cannot be continued any longer.

When any of these situations occur, the image forming device 1 stops the execution of the print job, transfers the print job to one printing device 12, 13, 14 or 15 connected to the network 9, and causes the printing device received the print job to execute the print job instead of the image forming device 1. As already mentioned in the description of the conventional technique, simply transmitting the print job to the printing device 12, 13, 14 or 15 does not solve the problem of having a wasted printed sheet as the printed sheet may not be produced as the user desires.

When an error that, for example, makes difficult to continue producing a printed output during execution of a print job is occurred, the image forming device 1 of the first preferred embodiment creates a first print preview image showing a printed output to be produced when the print job is executed in the image forming device 1. The image forming device 1 also creates respective second print preview images showing printed outputs to be produced when the print job is executed in each printing device 12, 13, 14 or 15 connected to the network 9. Here, a print preview image schematically shows the condition of a printed output to be produced as a result of execution of a print job, and the data of the print preview image is obtained by computation. So, the first print preview image shows the condition of a printed output in which features and others of the image forming device 1 are applied. The second print preview images created respectively for the printing devices 12, 13, 14 and 15 represent the conditions of printed outputs in which the respective features and others of the printing devices 12, 13, 14 and 15 are reflected.

The image forming device 1 displays the first and second print preview images together to a user. Then, the user makes comparison between the first print preview image showing a printed output to be produced when the print job is executed in the image forming device 1 to which instructions for printing given by the user, and each of the respective second print preview images created for the printing devices 12, 13, 14 and 15. As a result, the user can select a printing device capable of producing a printed output with the condition which satisfies the user. After the user selects one from the printing devices 12, 13, 14 and 15, the image forming device 1 designates the selected printing device as a destination of transfer of the print job, and transfers the print job which has been difficult to be executed in the image forming device 1 to the designated printing device.

Figure 5:
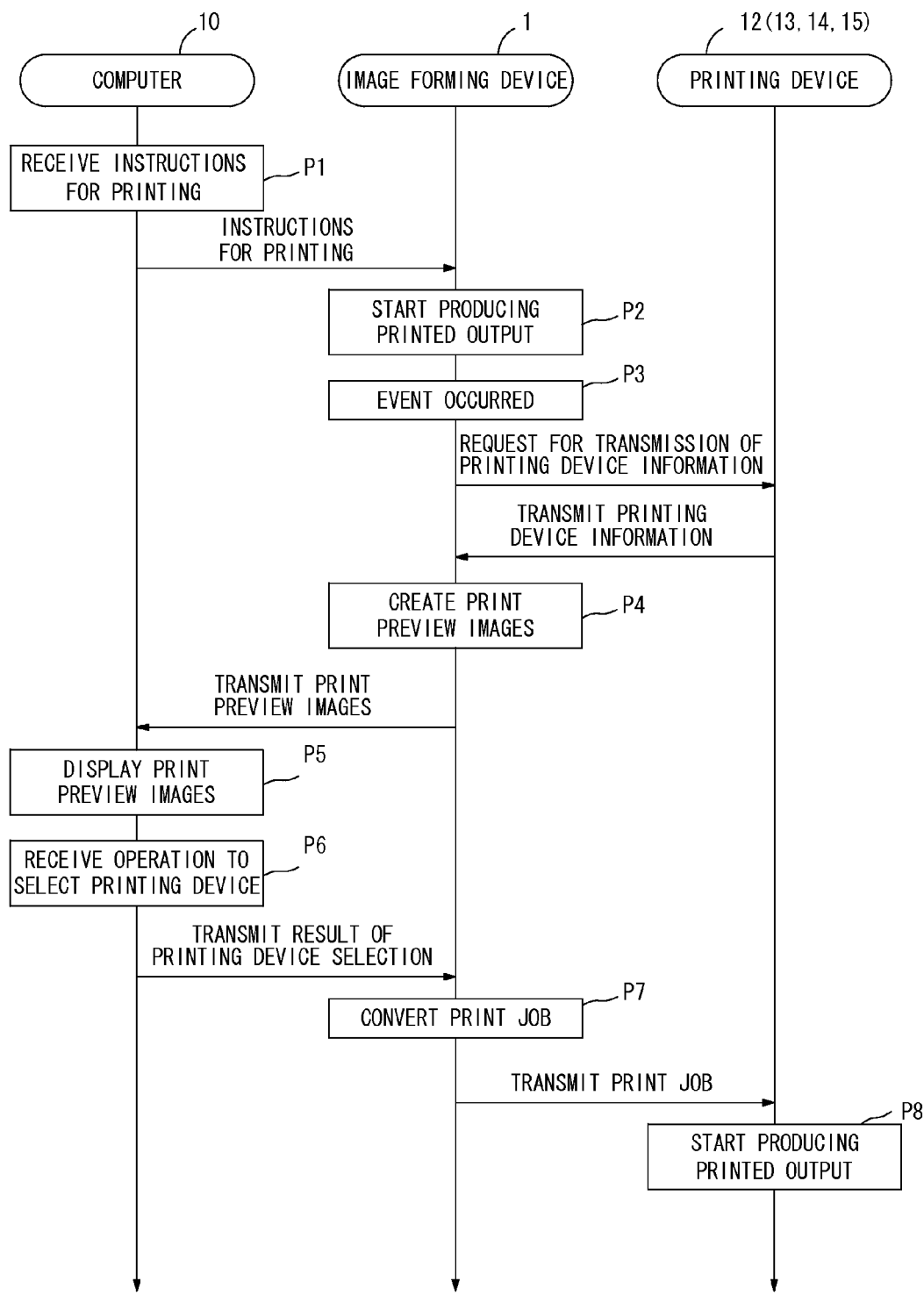
FIG. 5 shows the sequence of processes of the first preferred embodiment in order for the image forming device to transmit a print job.

FIG. 5 shows the sequence of processes in order for the image forming device 1 to transfer a print job. After instructions for printing from a user are given to the computer 10 (process P1), the computer 10 transmits the instructions for printing to the image forming device 1. The instructions for printing include a print job.

After receiving the instructions for printing, the image forming device 1 starts producing a printed output based on the print job received together with the instructions (process P2). When an event such as an error that makes difficult to continue producing a printed output in the image forming device 1 is occurred therein (process P3), the image forming device 1 stops execution of the print job, and sends requests to transmit own printing device information to each of the printing devices 12, 13, 14 and 15 connected to the network 9.

After receiving the request for transmission of the printing device information, the printing devices 12, 13, 14 and 15 each reads own printing device information 150 from the printing device information storage unit 52, and transmits the read printing device information 150 to the image forming device 1.

After receiving the printing device information 150 from each of the printing devices 12, 13, 14 and 15, the image forming device 1 creates respective second print preview images showing printed outputs to be produced when the print job is executed in the printing devices 12, 13, 14 and 15 based on the received printing device information 150. The image forming device 1 creates a first print preview image showing a printed output to be produced when the print job is executed in the image forming device 1 (process P4). The image forming device 1 then transmits the first and second print preview images to the computer 10.

After receiving the first and second print preview images from the image forming device 1, the computer 10 displays the received print preview images on the display unit 64 (process P5), and receives a user's operation to select a printing device (process P6). When the user selects one printing device that can produce a printed output with the condition satisfies the user, the computer 10 transmits a result of the user's printing device selection to the image forming device 1.

After receiving the result of the printing device selection from the computer 10, the image forming device 1 designates the printing device selected from the printing devices 12, 13, 14 and 15 as a destination of transfer of the print job, and converts the print job to data format suitable for executing the print job in the designated printing device (process P7). The image forming device 1 thereafter transfers the print job to the printing device designated as the destination of transfer of the print job.

The designated printing device received the print job transferred from the image forming device 1 executes the print job to start producing a printed output (process P8). This causes a printing device different from the image forming device 1 to execute the print job the execution of which has been made difficult in the image forming device 1 instead of the image forming device 1. The printing device that executes the print job at this time is selected from among the printing devices 12, 13, 14 and 15 by the user as a printing device capable of producing a printed output with the condition satisfies the user. So, a printed output to be produced by this printing device never goes to waste.

Figure 6:
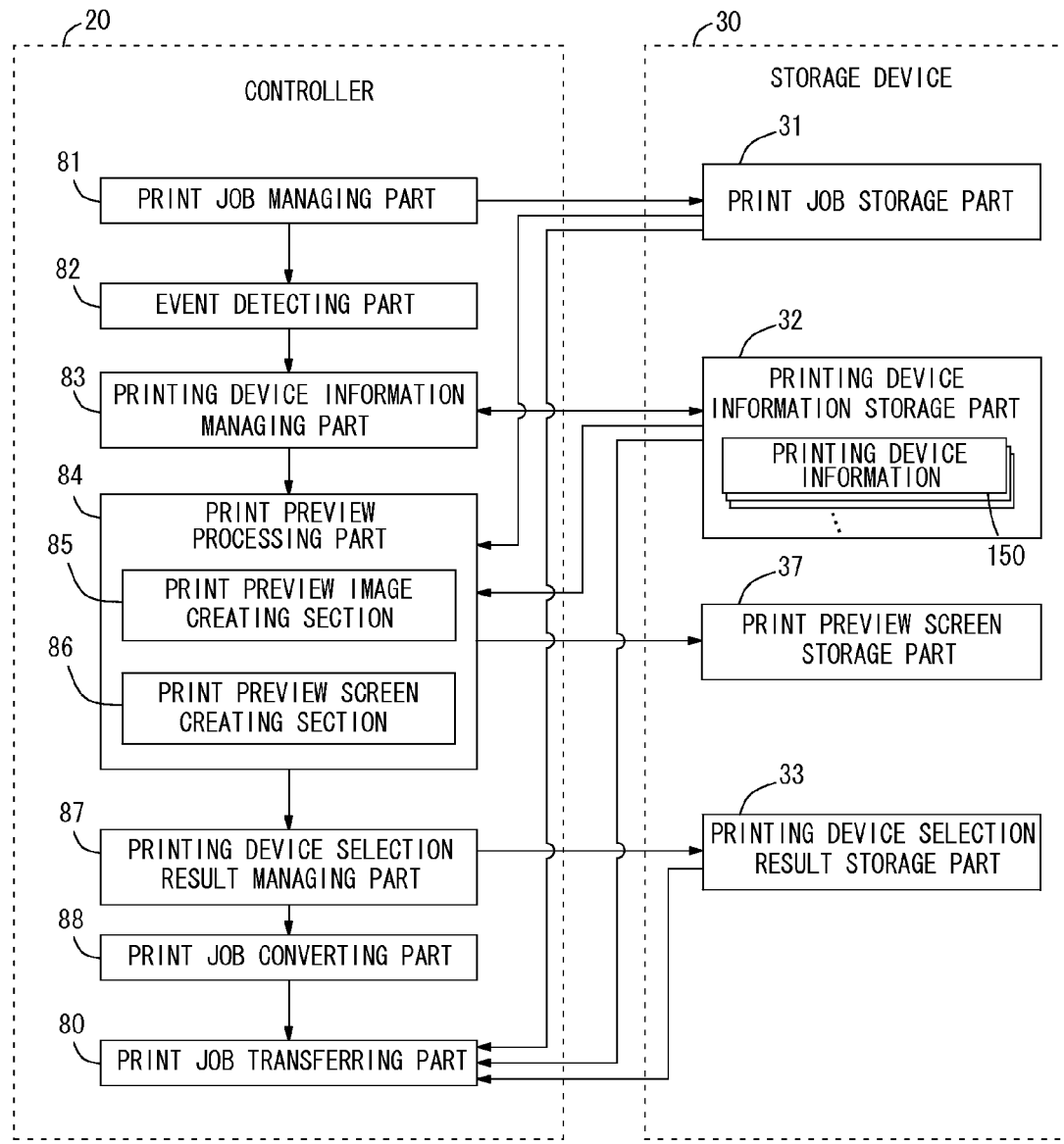
FIG. 6 is a block diagram showing the functional configuration realized by a controller of the image forming device.

Specific internal functions of the image forming device 1 for performing the above-described operations are described next. FIG. 6 is a block diagram showing in detail the functional configuration realized by execution of the program 34 by the controller 20 of the image forming device 1. FIG. 6 shows only those blocks that relate to the following function of the image forming device 1. More specifically, this function is to create a first print preview image for execution in the image forming device 1 and respective second print preview images for execution in the printing devices 12, 13, 14 and 15 when execution of a print job is made impossible in the image forming device 1 because of an event such as an error occurred therein, and transmit the created print preview images to the computer 10. This function is also to transfer, after transmission of the print preview images, the print job to a printing device selected from the printing devices 12, 13, 14 and 15 in response to user's printing device selection. Those blocks relating to the other functions are not shown in FIG. 6.

As seen from FIG. 6, the controller 20 executes the program 34 to function as a print job managing part 81, an event detecting part 82, a printing device information managing part 83, a print preview processing part 84, a printing device selection result managing part 87, a print job converting part 88, and a print job transferring part 80. The print preview processing part 84 includes a print preview image creating section 85 and a print preview screen creating section 86.

When the image forming device 1 receives and acquires a print job created by the computer 10 in response to user's instructions, the print job managing part 81 stores the received job to the print job storage part 31. A print job may also be created by the image forming device 1, for example, by reading document data stored in the storage device 30. In this case, the print job managing part 81 acquires the print job created from document data read from the storage device 30, and stores the print job to the print job storage part 31. After storing a print job, provided that the event detecting part 82 described below does not detect an event, the print job managing part 81 reads the print job at a point when execution of the print job became feasible, and outputs the print job to the image forming unit 3 to cause the image forming unit 3 to produce a printed output.

The event detecting part 82 is put into operation when a print job to be executed is stored in the print job storage part 31, and detects occurrence of an event in the image forming device 1. In the first preferred embodiment, examples of an event mentioned here include phenomena such as toner shortage, sheet shortage, stapler shortage and account balance shortage that make execution of a print job difficult in the image forming device 1. As a specific way of detecting occurrence of an event, for example, sheet shortage, the event detecting part 82 receives a signal from a sensor. The sensor not shown in FIG. 6 is provided in the sheet feeding section 3*b* for detecting the presence or absence of a sheet. The types of an event detected by the event detecting part 82 are not limited to those mentioned above. An event to be detected by the event detecting part 82 may arbitrarily be determined in advance.

The printing device information managing part 83 is put into operation when an event is detected by the event detecting part 82. The printing device information managing part 82 functions to search for a printing device through the network interface 25 that is connected to the network 9 and is different from the image forming device 1. When determining that the multiple printing devices 12, 13, 14 and 15 are connected to the network 9, the printing device information managing part 82 sends requests to each of the printing devices 12, 13, 14 and 15 to transmit own printing device information 150. When printing device information 150 is received from each of the printing devices 12, 13, 14 and 15, the printing device information managing part 83 stores the received printing device information 150 to the printing device information storage part 32. The printing device information storage part 32 also holds printing device information 150 in reference to the image forming device 1 stored in advance therein. So, after the printing device information managing part 83 stores the printing device information 150 acquired from each of the printing devices 12, 13, 14 and 15 through the network 9 to the printing device information storage part 32, several pieces of printing device information 150 are present in the printing device information storage part 32.

FIG. 7 shows an example of printing device information 150. The printing device information 150 contains device information unique to each of the image forming device 1 and the printing devices 12, 13, 14 and 15. To be more specific, as shown in FIG. 7, the printing device information 150 contains a device name 151 given to each device, an ID 152 for identifying the device, features information 153 indicating the features of the device, optional information 154 indicating an option equipped with the device, paper information 155 indicating the availability of each type of output sheet, and toner information 156 indicating the presence or absence of remaining toner. The device name 151 may include the model name of each device.

The features information 153 of each of the image forming device 1 and the printing devices 12, 13, 14 and 15 includes variety of printing device features information of the corresponding device. In the first preferred embodiment, examples of information stored as the features information 153 include a color profile, an available font, an internal processing resolution, a way of image compression, an image compression rate, a critical margin size, and a data format. The item of the available font contains font data of each available font. So, a print preview image showing a printed output to be produced when a print job is executed in each device is created by referring to the features information 153.

The optional information 154 of each of the image forming device 1 and the printing devices 12, 13, 14 and 15 contains information about presence or absence of an optional function in each of the image forming device 1 and the printing devices 12, 13, 14 and 15. Examples of information contained in the optional information 154 include the presence or absence of punching, stapling, double-sided printing, and bound printing.

Returning to FIG. 6, the print preview processing part 84 acquires respective print preview images showing printed outputs to be produced when the same print job is executed in the image forming device 1 and the printing devices 12, 13, 14 and 15, and outputs the acquired print preview images. Especially in the first preferred embodiment, as the print preview image creating section 85 is provided in the print preview processing part 84, the print preview processing part 84 acquires print preview images from the print preview image creating section 85.

More specifically, the print preview image creating section 85 creates first and second print preview images based on a print job stored in the print job storage part 31. Still more specifically, the print preview image creating section 85 emulates the respective features of the image forming device 1 and the printing devices 12, 13, 14 and 15 based on the printing device information 150 of each of these printing devices stored in the printing device information storage part 32, thereby creating the first and second print preview images. As an example, the first print preview image is created by emulating the features of the image forming device 1 based on the printing device information 150 of the image forming device 1 stored in the printing device information storage part 32. Further, the second print preview images are created by emulating the respective features of the printing devices 12, 13, 14 and 15 based on the printing device information 150 of each printing device 12, 13, 14 and 15 stored in the printing device information storage part 32. An exemplary way of creating these print preview images is described in more detail next.

First, the print preview image creating section 85 reads a print job from the print job storage part 31. Examples of information contained in the print job include graphic data formed from a vector image a user created with the computer 10 or another device, print setting information in which settings desired by the user such as a paper size and a margin size are defined, and job ID information for specifying the print job. The print preview image creating section 85 reads these pieces of information, and creates a first print preview image based on the read print job. More specifically, the print preview image creating section 85 rasterizes the graphic data to obtain a raster image. The obtained raster image is enlarged or reduced as required based on the print setting information including settings such as a paper size and a margin size. The image processed as required incorporates the print features of the image forming device 1 based on the printing device information 150 of the image forming device 1 becomes the first print preview image.

Next, the print preview image creating section 85 reads printing device information 150 of each printing device 12, 13, 14 and 15 from the printing device information storage part 32. To be more specific, the print preview image creating section 85 reads features information 153 as part of the printing device information 150 of each of the printing devices 12, 13, 14 and 15. Then, based on the read features information 153, the print preview image creating section 85 converts the first print preview image to conform to the respective print features of the printing devices 12, 13, 14 and 15, thereby creating second print preview images. The second preview images are created respectively for the printing devices 12, 13, 14 and 15.

As described, in the first preferred embodiment, the print preview image creating section 85 creates the first print preview image first. Then, the print preview image creating section 85 converts the first print preview image to conform to the respective print features of the printing devices 12, 13, 14 and 15 to create second print preview images. At this time, the following four conversions are considered to be important: (1) color conversion; (2) font conversion; (3) paper size conversion; and (4) margin conversion. These four conversions are described in detail next. The four conversions are carried out in an arbitrarily set order.

Regarding the color conversion (1), the print preview image creating section 85 reads the color profile of each of the image forming device 1 and the printing devices 12, 13, 14 and 15 from own features information 153. Then, the print preview image creating section 85 compares the color profile of the image forming device 1 with that of the printing devices 12, 13, 14 and 15, respectively, and converts the color of the first print preview image to conform to that of the respective color profiles of the printing devices 12, 13, 14 and 15.

Regarding the font conversion (2), the print preview image creating section 85 reads the list of available fonts, and the font data of available fonts of each of the image forming device 1 and the printing devices 12, 13, 14 and 15 from own features information 153. When a font X that is not one of the available fonts of the printing device 12, 13, 14 or 15 is used in the first print preview image, the font data of the font X and the font data of each of the available fonts of the printing device are rasterized. Then, the created raster images are overlaid with each other. At this time, a font has the maximum number of pixels overlapping the raster image of the font X is selected as an alternative font from those of the respective raster images of the available fonts of the printing device 12, 13, 14 or 15. Then, the font data of the font X used in the first print preview image is replaced by the font data of the alternative font, thereby converting the first print preview image. When a font Y that is one of the available fonts of the printing device 12, 13, 14 or 15 is used in the first print preview image, the font data of the font Y used in the first print preview image is replaced by the font data of the font Y of this printing device, thereby converting the first print preview image.

Regarding the conversion (3), the print preview image creating section 85 reads information in reference to the availability of paper in each size in each of the printing devices 12, 13, 14 and 15 from own paper information 155. When a paper size specified at the time of creation of the first print preview image is indicated "No" in the paper information 155 of the printing device 12, 13, 14 or 15, a paper size closest to that specified at the time of creation of the first print preview image is selected from the paper sizes indicated "Yes" in the paper information 155 of this printing device. Then, the first print preview image is enlarged or reduced, or is moved parallel to itself, thereby converting the first print preview image.

Regarding the margin conversion (4), the print preview image creating section 85 reads a critical margin size of each of the printing devices 12, 13, 14 and 15 from own features information 153, and compares the read critical margin sizes with the margin size of the first print preview image. When the margin size of the first print preview image is smaller than the critical margin size of the printing device 12, 13, 14 or 15, the print preview image creating section 85 enlarges or reduces the first print preview image, moves the first print preview image parallel to itself, or deletes part of the first print preview image, thereby converting the first print preview image. As a result, the converted first print preview image conforms to the respective critical margin sizes of the printing devices 12, 13, 14 and 15 read from their respective features information 153.

The print preview image creating section 85 carries out a conversion, in addition to the conversions (1) to (4), such as that for making the internal processing resolution of the image forming device 1 conform to those of the printing devices 12, 13, 14 and 15. As a result, respective second print preview images showing printed outputs to be produced when a print job is executed in the printing devices 12, 13, 14 and 15 are created from the first print preview image. However, when the printing device 12, 13, 14 or 15 is one of the same models as the image forming device 1, or has the same option as the image forming device 1, for example, some or all of the conversions (1) to (4) become unnecessary processes, and are not carried out accordingly.

The second print preview images thereby created correspond to printed outputs in which the respective color profiles, respective available fonts and others of the printing devices 12, 13, 14 and 15 are applied. The first print preview image corresponds to a printed output in which the color profile, available fonts and others of the image forming device 1 are applied. Different printed outputs are produced when the features such as a color profile to be applied differ between the image forming device 1 and each of the printing devices 12, 13, 14 and 15. So, the first print preview image is different from each of the second print preview images. The respective second print preview images created corresponding to the printing devices 12, 13, 14 and 15 are also different.

The print preview image creating section 85 saves both the first and second print preview images temporarily in the print preview image storage unit 35 of the storage device 30 (see FIG. 2).

The print preview screen creating section 86 creates a screen in which the first and second print preview images thereby created are arranged in a predetermined pattern. The screen created by the print preview screen creating section 86 is displayed, for example, on the display unit 64 of the computer 10. An example of the predetermined pattern is such that, to arrange the first print preview image in a certain reference position, and the second print preview images around of the reference position. As an exemplary way to follow the predetermined pattern, the print preview screen creating section 86 compares each of the second print preview images with the first print preview image. Then, the print preview screen creating section 86 arranges the second print preview images in ascending order of difference from the first print preview image. More specifically, a second print preview image with the smallest difference is arranged closest to the reference position in which the first print preview image is arranged. The print preview screen creating section 86 may also display certain information contained in the printing device information 150 of each of the image forming device 1 and the printing devices 12, 13, 14 and 15 on the screen.

FIGS. 10A, 10B, 11A and 11B each shows an example of a print preview screen 120 created by the print preview screen creating section 86. Any one of the screen layouts shown in FIGS. 10A, 10B, 11A and 11B may be applied as the layout of a screen created by the print preview screen creating section 86.

Figure 10A:
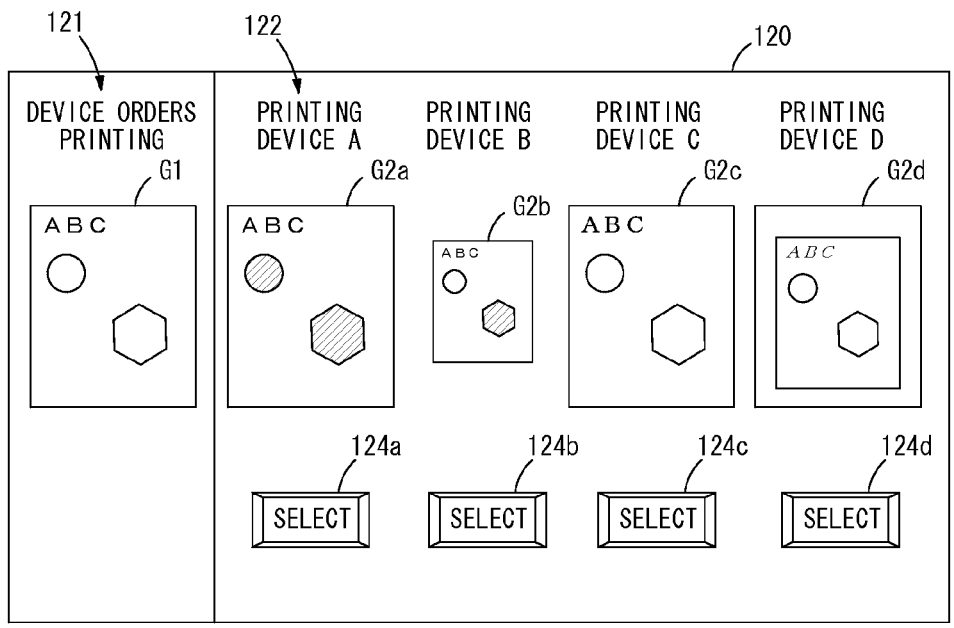

The print preview screen 120 shown in FIG. 10A includes a first display area 121 in the left region of the screen that functions as a reference position in which a first print preview image G1 is displayed. The remaining region on the right side of the first display area 121 is a second display area 122 in which second print preview images G2a, G2b, G2c and G2d are displayed. On the screen 120 shown in FIG. 10A, the second print preview images G2a, G2b, G2c and G2d are arranged in order of ascending difference from the first print preview image G1 in the second display area 122. So, the second print preview image G2a is arranged the closest to the first print preview image G1, and the second print preview images G2b, G2c and G2d are arranged in the order as shown in FIG. 10A in the first display area 121. The second print preview images G2a, G2b, G2c and G2d are print preview images showing printed outputs to be produced when the print job is executed in printing devices A, B, C and D (corresponding to the printing devices 12, 13, 14 and 15 respectively shown in FIG. 1).

Selection buttons 124a, 124b, 124c, and 124d are displayed below the second print preview images G2a, G2b, G2c and G2d respectively in the second display area 122. The Selection buttons 124a, 124b, 124c, and 124d are provided to make selection of a second print preview image showing a printed output that satisfies the user, thereby causing a printing device capable of producing the printed output to execute a print job instead of the image forming device 1. So, the screen in which each of the second print preview images G2a, G2b, G2c and G2d are compared with the first print preview image G1 showing a printed output to be produced for execution of a print job in the image forming device 1 is displayed. A user selects one from the second print preview images G2a, G2b, G2c and G2d that shows a desirable printed output, and operates the corresponding selection button on the screen. As a result, the user selects a printing device executes the print job instead of the image forming device 1.

Figure 10B:
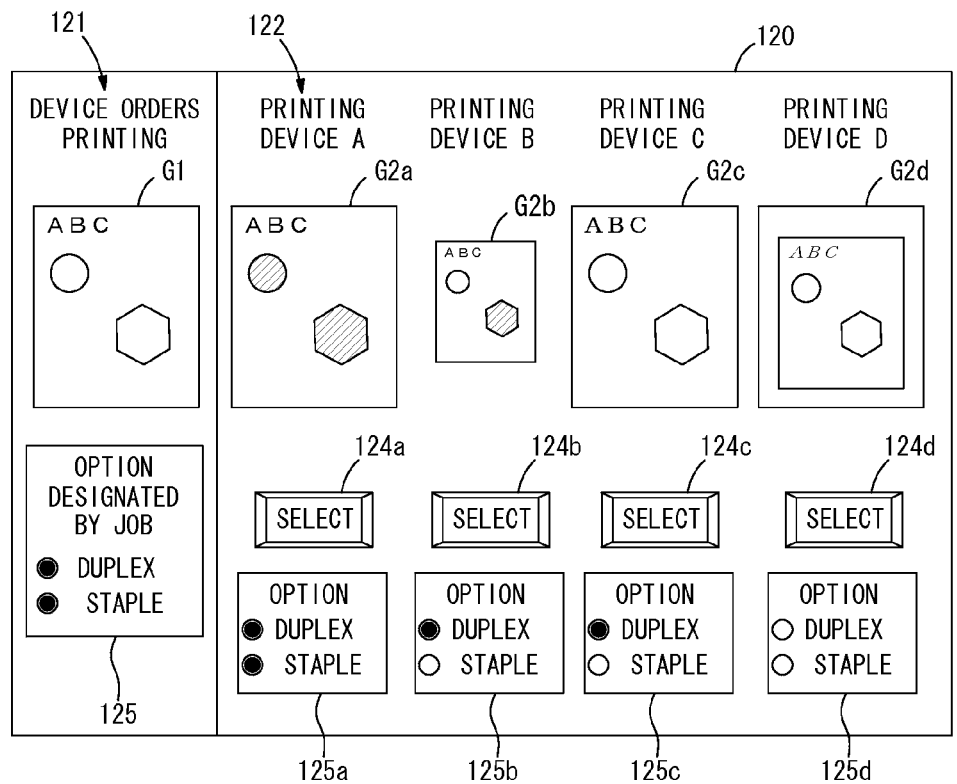

Referring next to the print preview screen 120 shown in FIG. 10B, its layout is not only for the second print preview images G2a, G2b, G2c and G2d to be compared with the first print preview image G1, but that feasibility of execution of an option designated by a print job in the printing devices 12, 13, 14 and 15 can be determined. More specifically, the first display area 121 includes an option display field 125 displayed below the first print preview image G1. The option display field 125 shows an option designated by a print job. FIG. 10B shows that double-sided printing and stapling are designated by the print job. Further, the second display area 122 includes option display fields 125a, 125b, 125c and 125d displayed below the second print preview images G2a, G2b, G2c and G2d respectively. The option display fields 125a, 125b, 125c and 125d each shows a feasible option when the print job is executed in the printing devices A, B, C and D. FIG. 10B shows that duplex printing and stapling are both feasible in the printing device A, that only duplex printing is feasible in the printing devices B and C, and that neither of duplex printing nor stapling is feasible in the printing device D. So, with each of the second print preview images G2a, G2b, G2c and G2d compared with the first print preview image G1 on the screen, a user selects one from among the second print preview images G2a, G2b, G2c and G2d that shows a desirable printed output. At this time, the user is allowed to determine whether or not an option the user designated by a print job when giving instructions for printing to the image forming device 1 is feasible in each of the printing devices 12, 13, 14 and 15. So, the user selects a printing device to make execution of the print job instead of the image forming device 1 while referring to the feasibility of an option in the printing devices 12, 13, 14 and 15.

The print preview screen 120 shown in FIG. 11A includes a font similarity display field 126 displayed on its lower part. The font similarity display field 126 shows the respective degrees of similarity of fonts used in the second print preview images G2a, G2b, G2c and G2d to that used in the first print preview image G1. The print preview screen creating section 86 assesses the respective degrees of similarity of fonts used in the second print preview images G2a, G2b, G2c and G2d to that used in the first print preview image G1 when making comparison of each of the second print preview images G2a, G2b, G2c and G2d with the first print preview image G1. Then, the print preview screen creating section 86 arranges the second print preview images G2a, G2b, G2c and G2d in descending order of degree of similarity. So, the second print preview image G2a with the highest degree of similarity is arranged the closest to the first print preview image G1. The font similarity display field 126 shows the respective degrees of similarity of fonts used in the second print preview images G2a, G2b, G2c and G2d to that used in the first print preview image G1 by numerical values, bar graphs or others. So, a user can specifically know how different the fonts in respective printed outputs to be produced when a print job is executed in the printing devices 12, 13, 14 and 15 is to be from a font in a printed output to be produced when the print job is executed in the image forming device 1.

The print preview screen 120 shown in FIG. 11B includes a color similarity display field 127 displayed on its lower part. The color similarity display field 127 shows the respective degrees of similarity of colors used in the second print preview images G2a, G2b, G2c and G2d to that used in the first print preview image G1. The print preview screen creating section 86 assesses the respective degrees of similarity of colors used in the second print preview images G2a, G2b, G2c and G2d to that used in the first print preview image G1 when making comparison of each of the second print preview images G2a, G2b, G2c and G2d with the first print preview image G1. Then, the print preview screen creating section 86 arranges the second print preview images G2a, G2b, G2c and G2d in descending order of degree of similarity. So, the second print preview image G2a with the highest degree of similarity is arranged the closest to the first print preview image G1. The color similarity display field 127 shows the respective degrees of similarity of colors used in the second print preview images G2a, G2b, G2c and G2d to that used in the first print preview image G1 by numerical values, bar graphs or others. So, a user can specifically know how different that the colors in respective printed outputs to be produced when a print job is executed in the printing devices 12, 13, 14 and 15 is to be from a color in a printed output to be produced when the print job is executed in the image forming device 1.

Figure 12:
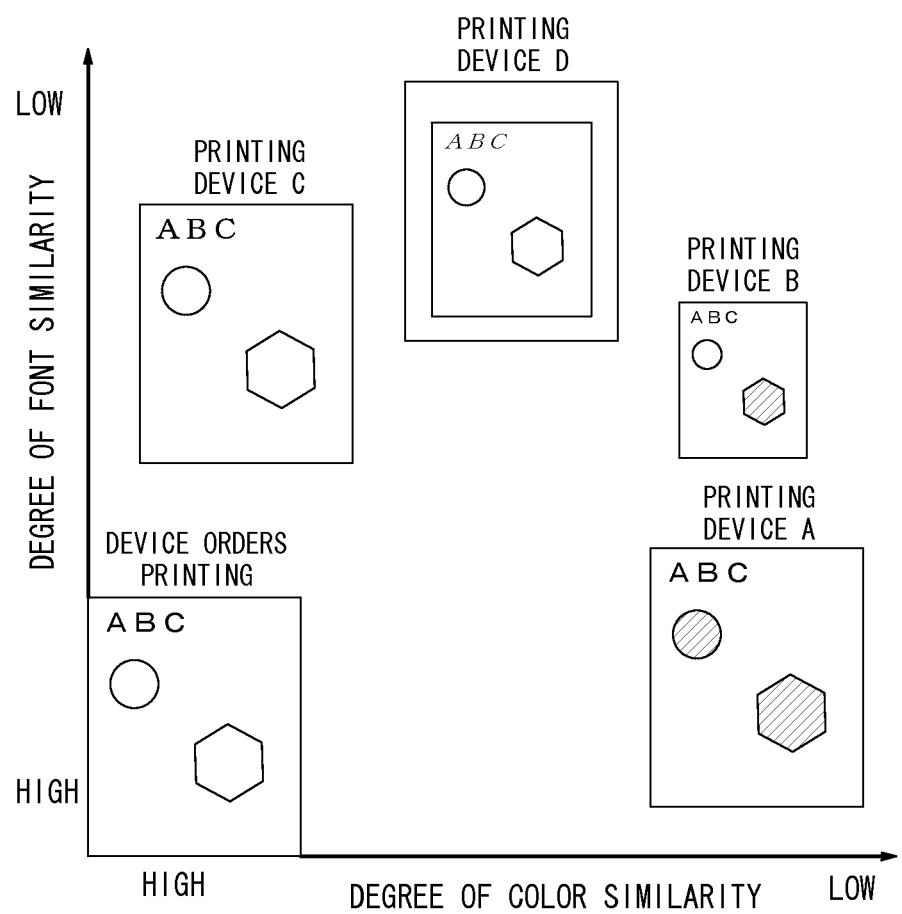
FIG. 12 shows an exemplary display style of first and second print preview images.

FIG. 12 shows an exemplary display style of displaying the degree of font similarity and the degree of color similarity at the same time. In the X-Y coordinate system shown in FIG. 12 with the X-axis representing the degree of color similarity and Y-axis representing the degree of font similarity, directions in which degrees of similarity are reduced are positive directions. In this style, a first print preview image is arranged close to the origin of the X-Y coordinate system, and second print preview images are arranged in their respective coordinates that correspond to their degrees of font similarity and their degree of color similarity. So, according to this style, the font similarity and the color similarity of each of the second print preview images to the first print preview image can be displayed at the same time on the print preview screen 120 described above. Thus, a user can specifically know how different that the fonts and colors in respective printed outputs to be produced when a print job is executed in the printing devices 12, 13, 14 and 15 are to be from a font and a color in a printed output to be produced when the print job is executed in the image forming device 1.

On the exemplary screens explained above, the second print preview images G2a, G2b, G2c and G2d are arranged in ascending order of difference from the first print preview image G1. So, a second print preview image with the smallest difference is arranged the closest to the first print preview image G1. The user sees a print preview screen 120 of any of such patterns, and selects a printing device capable of producing a desirable printed output as a printing device for executing a print job instead of the image forming device 1 as described later. So, by arranging the second print preview images G2a, G2b, G2c and G2d in a manner described above, the user can easily designate a printing device that is capable of producing a printed output the most similar to that to be produced when a print job is executed in the image forming device 1, thereby facilitating a user's operation for selection. The style shown in FIG. 12 incorporates a result of comparison of each of the second print preview images with the first print preview image based on a plurality of elements including a font and a color. This style is advantageously used, especially for the reason that, when selecting a printing device capable of producing a printed output the most similar to that to be produced in the image forming device 1, the user can consider a plurality of elements together to make selection of such a printing device.

When second print preview images include portions that are not found in a first print preview image, the print preview screen creating section 86 may highlight these portions, or may extract these portions to create a print preview screen 120 including only the extracted portions. This causes a user to pay attention to the portions of the second print preview images that are not found in the first print preview image. So, the user is allowed to precisely notice the differences between portions of a printed output to be produced when a print job is executed in the image forming device 1 and those to be produced when the print job is executed in the printing devices 12, 13, 14 and 15.

Figure 13A:
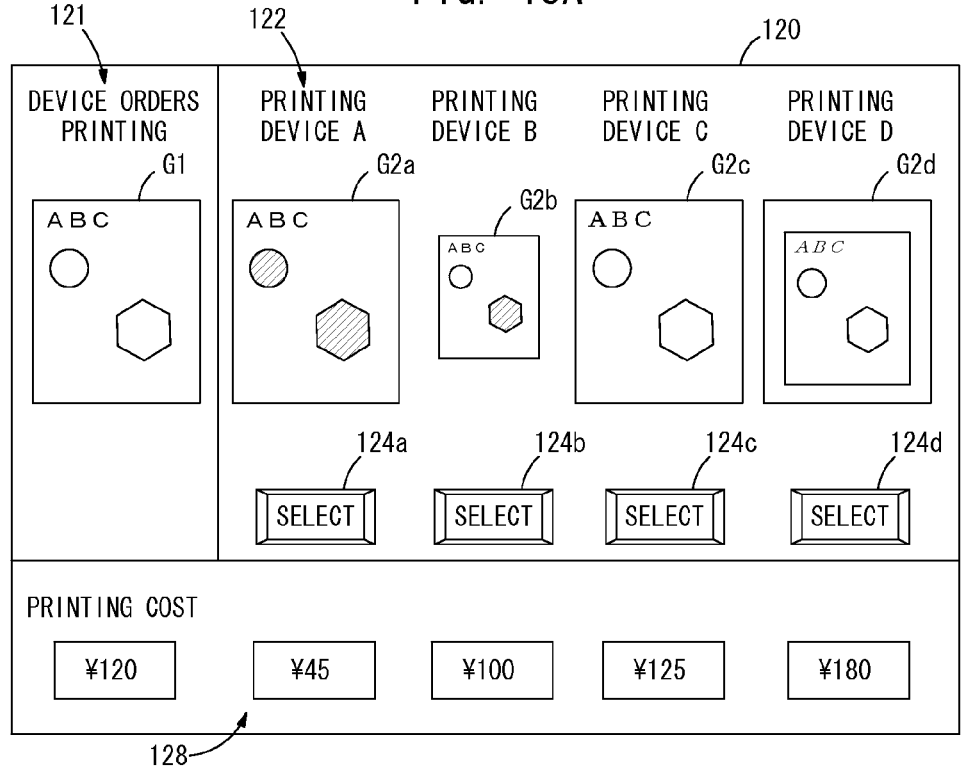
FIGS. 13A and 13B each shows an example of a print preview screen.
Figure 13B:
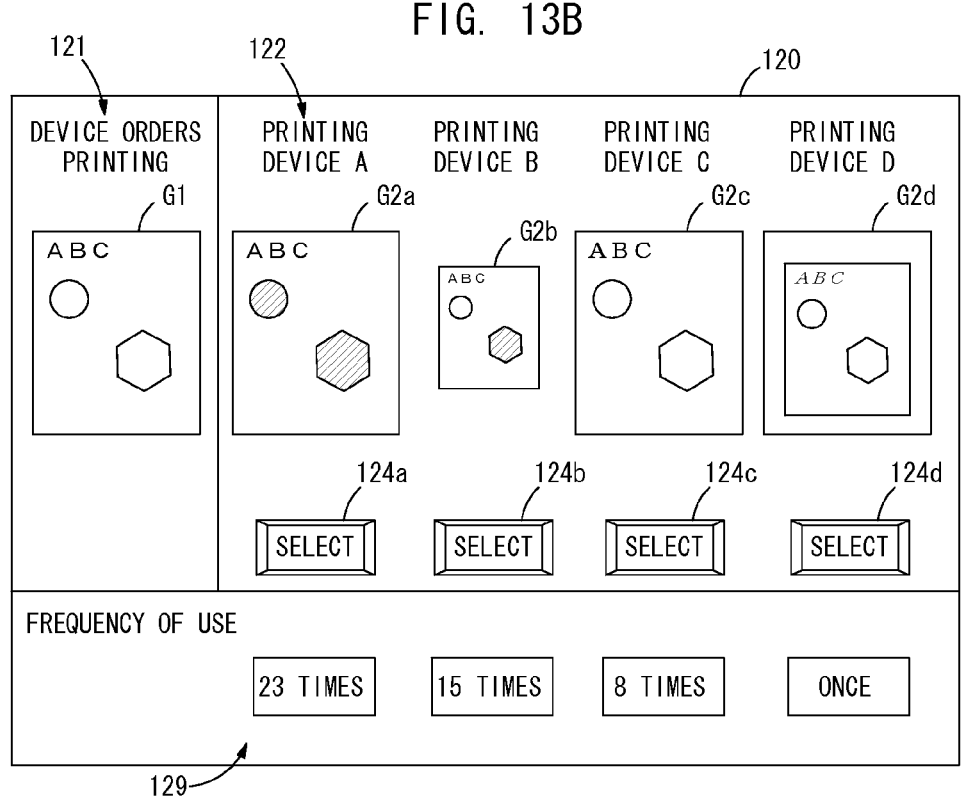

On the exemplary screens shown above, the second print preview images are arranged in ascending order of difference from the first print preview image. Therefore, the second print preview image with the smallest difference is arranged closest to the first print preview image. In addition to these examples, a print preview screen 120 created by the print preview screen creating section 86 may have various types of layouts. Some examples of other types of layouts of a print preview screen 120 are described next. FIGS. 13A and 13B show examples of different screen layouts.

FIG. 13A shows an example of the print preview screen 120 on which comparisons between respective printing costs required when a print job is executed in the printing devices 12, 13, 14 and 15, and a printing cost required when the print job is executed in the image forming device 1 are displayed. The print preview screen 120 shown in FIG. 13A includes a printing cost display field 128 at the bottom. The printing cost display field 128 shows printing costs required when a print job is executed in the image forming device 1 and in the printing devices 12, 13, 14 and 15. In the second display area 122, the second print preview images G2a, G2b, G2c and G2d are placed in ascending order of printing cost. So, a second print preview image requiring the lowest printing cost is arranged the closest to the first print preview image G1. This layout allows a user to specifically know the printing costs required for execution of a job in the printing devices 12, 13, 14 and 15 instead, with making comparison with the cost required for execution of the print job in the image forming device 1. So, the user selects a printing device while referring to the respective printing costs of the image forming device 1 and of the printing devices 12, 13, 14 and 15.

FIG. 13B shows an example of the print preview screen 120 on which frequencies of use of the printing devices 12, 13, 14 and 15 by the user are displayed. The print preview screen 120 shown in FIG. 13B includes a frequency of use display field 128 at the bottom. The frequency of use display field 129 shows the respective numbers of times the printing devices 12, 13, 14 and 15 have been used. The frequencies of use mentioned here mean the respective number of times the user caused the printing devices 12, 13, 14 and 15 to execute a print job instead of the image forming device 1 when an event is occurred. The event is, for example, that makes execution of the print job difficult in the image forming device 1. In the second display area 122, the second print preview images G2a, G2b, G2c and G2d are arranged in descending order of frequency of use of the corresponding printing devices. So, a second print preview image corresponding to a printing device with the highest frequency of use is arranged the closest to the first print preview image G1. This layout allows a user to specifically know the respective numbers of times the printing devices 12, 13, 14 and 15 have executed a print job instead of the image forming device 1 in the past. So, the user can select a printing device based on a track record of use.

A print preview screen to be created by the print preview screen creating section 86 may arbitrarily be selected from among the print preview screens 120 described above, and this setting may be configured in advance in the image forming device 1.

After creating a print preview screen 120 in the above-described way, the print preview screen creating section 86 stores the created print preview screen 120 to the print preview screen storage part 37.

Returning to FIG. 6, the print preview processing part 84 transmits and outputs the first and second print preview images to the computer 10 through the network interface 25 in order for the first and second print preview images to be displayed on the display unit 64 of the computer 10. The print preview processing part 84 transmits the first and second print preview images to the computer 10 in the following three ways. In the first way, when the computer 10 makes access to the image forming device 1 through the network 9, the print preview processing part 84 reads a print preview screen 120 from the print preview screen storage part 37, and transmits the read print preview screen 120 to the computer 10 by using the Web server function described above. In the second way, the print preview processing part 84 attaches the first and second print preview images to an e-mail message, and transmits the e-mail message to the computer 10. More specifically, the print preview processing part 84 reads both the first and second print preview images from the print preview image storage unit 35, creates an e-mail message to which the read first and second print preview images are attached, and transmits the e-mail message to an e-mail address allocated to the computer 10. In the third way, the print preview processing part 84 directly transmits a print preview screen 120 to the controller 60 of the computer 10 through the network 9. Then, the transmitted print preview screen 120 is displayed in a pop-up window on the display unit 64 by the function of the driver program 73 resident in the controller 60.

According to the first and the third ways, a print preview screen 120 created by the print preview screen creating section 86 is displayed on the display unit 64 of the computer 10. So, while viewing the print preview screen 120 displayed on the display unit 64, a user designates a printing device capable of producing a desirable printed output from the printing devices 12, 13, 14 and 15 connected to the network 9. The user also makes an operation on the print preview screen 120 to select the designated printing device. So, the image forming device 1 receives a result of printing device selection from the computer 10 indicating the printing device selected by the user to be designated.

According to the second way, the first and second print preview images are transmitted to the computer 10 in the form of files attached to an e-mail message. Accordingly, the contents of the e-mail message received at the computer 10 are displayed on the display unit 64 of the computer 10. FIG. 14 shows an example of an e-mail message 130 received by the computer 10. Referring to FIG. 14, the e-mail message 130 contains header information 131, body information 132, and attachment information 133. The subject box in the header information 131 includes an indication that a user should select an alternative printing device, and a job ID of a print job transmitted to the image forming device 1. The body information 132 includes an indication that the image forming device 1 that received the print job cannot execute the print job. The body information 132 also includes the file names of the respective second print preview images showing printed outputs to be produced when the print job is executed in the printing devices A, B, C and D. The attachment information 133 includes the first print preview image (MFP1.jpg) and the second print preview images (printerA.jpg, printerB.jpg, printerC.jpg and printerD.jpg). In this case, the user sees each image attached to the e-mail message 130, for example, with a manual operation, and designates a printing device capable of producing a desirable printed output selected from among the printing devices 12, 13, 14 and 15. Then, in order to notify the image forming device 1 of the designated printing device, the user transmits a reply e-mail message in which the ID of the designated printing device is recited in the body of the message. So, the image forming device 1 receives the reply message as a result of user's printing device selection.

The result managing part 87 shown in FIG. 6 stores a result of user's printing device selection to the result storage part 33 when the image forming device 1 receives a result of user's printing device selection from the computer 10.

The print job converting part 88 reads a print job from the print job storage part 31, and converts the read print job to data in a format practicable for executing the print job in a printing device designated by a result of printing device selection. More specifically, based on a result of printing device selection stored in the result storage part 33, the print job converting part 88 reads printing device information 150 of a printing device selected by a user from the printing device information storage part 32. Then, the print job converting part 88 designates a data format that is practicable in the selected printing device, and converts a print job to data in the designated data format. This conversion of a print job is not performed when the image forming device 1 and the printing device designated by the result of printing device selection have the same practicable data format.

The print job transferring part 80 transmits the print job converted by the print job converting part 88 to the printing device designated by the result of printing device selection. So, the printing device selected by the user receives the print job transmitted from the print job transferring part 80, and then execute the received print job instead of the image forming device 1 to. Thus, even in a situation where the image forming device 1 finds difficulty in executing the print job, the user can obtain a printed output produced in a different printing device by causing the different printing device to execute the print job. In this case, the user checks in advance that a desirable printed output is to be obtained, so the user has no compliant about the printed output produced in the different printing device. Thus, the printed output produced in the different printing device never goes to waste.

The account balance (deposit) of the image forming device 1 may be used in order for the print job transmitted from the print job transferring part 80 to the designated printing device to be executed in the designated printing device. By way of example, the total amount of money deposited in the image forming device 1 is recorded in advance in the image forming device 1. When the print job transferring part 80 transmits the print job to the printing device selected by the user, the image forming device 1 deducts the amount of money required for executing the print job in the selected printing device from the total amount of deposited money recorded in the image forming device 1. Then, the image forming device 1 transmits information about the amount of money together with the print job to the selected printing device. After receiving the information about the amount of money and the print job, the selected printing device adds the amount deducted in the image forming device 1 to the total amount of deposited money recorded in the selected printing device itself, and thereafter executes the print job. In response to execution of the print job, the selected printing device deduces the amount of money required for executing the print job from the total amount of deposited money recorded in the selected printing device itself. Thus, when the different printing device executes the print job instead of the image forming device 1, the cost required for executing the print job can be charged to the image forming device 1. It is assumed an account balance is managed for each user of the image forming device 1. In such case, when the user causes the image forming device 1 to transfer the print job to the different printing device to execute the print job in the different printing device, the cost required for executing the print job may be charged to this user.

Figure 8:
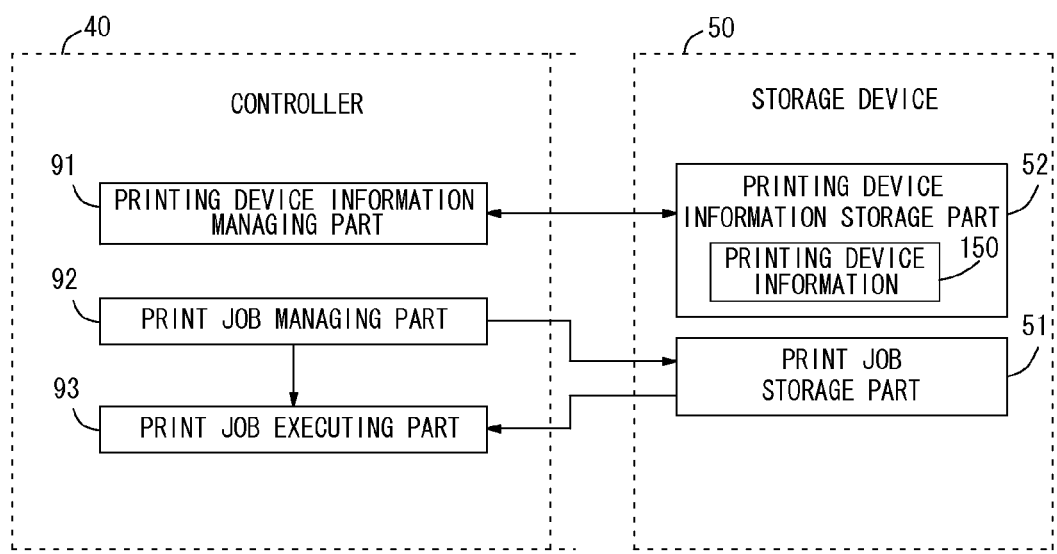
FIG. 8 is a block diagram showing an exemplary functional configuration realized by a controller of the printing device.

The functional configuration of the printing devices 12, 13, 14 and 15 is described next. FIG. 8 is a block diagram showing an exemplary functional configuration realized by execution of the program 53 by the controller 40 of each of the printing devices 12, 13, 14 and 15. FIG. 8 shows only those blocks that relate to the following function of each of the printing devices 12, 13, 14 and 15. More specifically, this function is to transmit printing device information 150 to the image forming device 1 in response to a request from the image forming device 1 when execution of the print job is made difficult in the image forming device 1 because of the occurrence of an event therein, and to thereafter acquire and execute the print job transmitted from the image forming device 1. Those blocks relating to the other functions such as a copy function, a scan function and a FAX function are not shown in FIG. 8.

As seen in FIG. 8, the controller 40 executes the program 53 to function as a printing device information managing part 91, a print job managing part 92, and a print job executing part 93.

The printing device information managing part 91 checks on conditions such as presence or absence of an output sheet, and of toner at regular intervals, and updates printing device information stored in the printing device information storage unit 52. When receiving a request for transmission of printing device information from the image forming device 1, the printing device information managing part 91 reads printing device information 150 from the printing device information storage unit 52, and transmits the read printing device information 150 to the image forming device 1. To be more specific, in the first preferred embodiment, the printing device information managing part 91 determines whether or not a corresponding one of the printing devices 12 to 15 is in a state where a printed output can be produced when receiving the request for transmission of printing device information from the image forming device 1. When the corresponding printing device is in a state where a printed output can be produced, the printing device information managing part 91 reads printing device information 150 from the printing device information storage unit 52, and transmits the read printing device information 150 to the image forming device 1. An example of the state where a printed output can be produced is such that toner is kept, and at least one type of one output sheet is present in the corresponding printing device.

When the feasible print job is transmitted from the image forming device 1, the print job managing part 92 receives and stores the transmitted print job to the print job storage unit 51. The print job executing part 93 controls the operation including reading of a print job from the print job storage unit 51 by the print job managing part 92, execution of the read print job, and production of a printed output. A printed output produced as a result of execution of the print job by the print job executing part 93 corresponds to a second print preview image that has been selected in advance by the user as a desirable print preview image.

Figure 9:
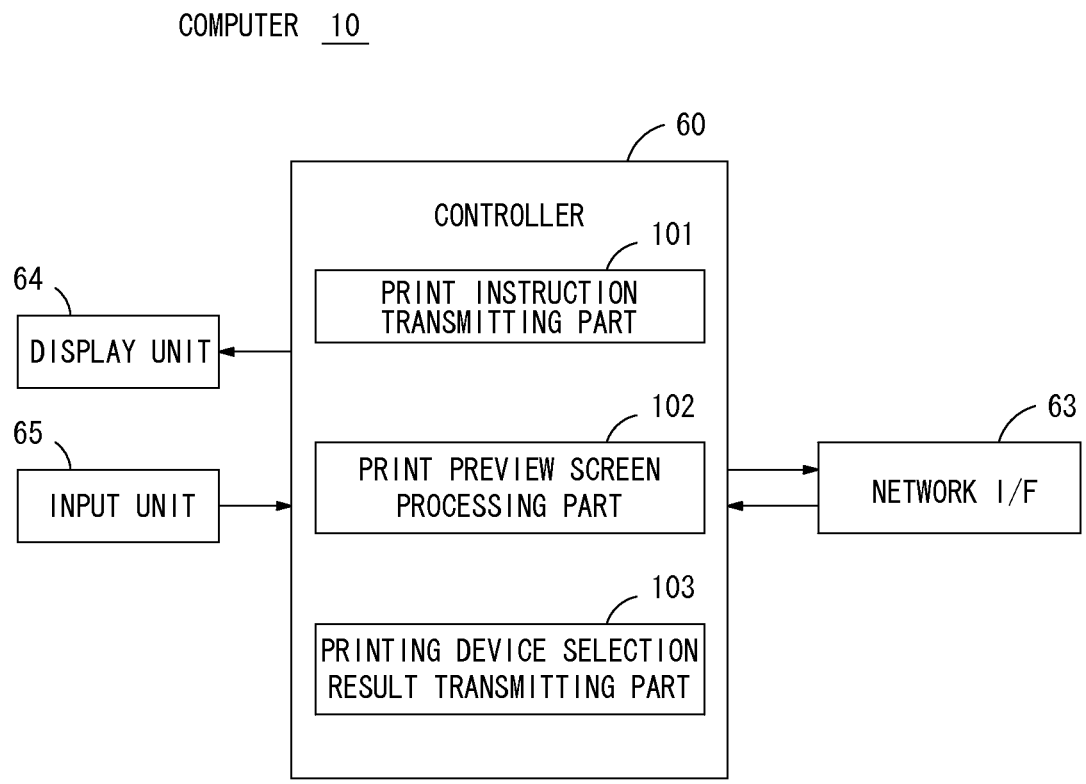
FIG. 9 is a block diagram showing an exemplary functional configuration realized by a controller of the computer.

The functional configuration of the computer 10 is described next. FIG. 9 is a block diagram showing an exemplary functional configuration that is realized after the controller 60 of the computer 10 activates the system program 71, the application program 72, and the driver program 73. FIG. 9 shows only those blocks that related to the following function of the computer 10. More specifically, this function is to give instructions for printing to the image forming device 1. This function is also to present first and second print preview images to the user, and transmit a result of user's printing device selection to the image forming device 1 when execution of the print job is made impossible in the image forming device 1 in response to the occurrence of an event therein. Those blocks relating to the other functions are not shown in FIG. 9.

As seen from FIG. 9, the controller 60 functions as a print instruction transmitting part 101, a print preview screen processing part 102, and a printing device selection result transmitting part 103. The print instruction transmitting part 101 gives instructions for printing to the image forming device 1 in response to user's instructions to produce a printed output of document data to the computer 10. The print instruction transmitting part 101 creates a print job to be transmitted to the image forming device 1. The print preview screen processing part 102 displays the print preview screen 120 received from the image forming device 1 on the display unit 64. When the computer 10 receives an e-mail message from the image forming device 1 to which the first and second print preview images are attached, the print preview screen processing part 102 displays the contents of the received e-mail message and the images attached thereto on the display unit 64. When the user selects one from among the printing devices 12, 13, 14 and 15, the result transmitting part 103 transmits a result of the user's selection, namely a result of the printing device selection to the image forming device 1.

Each of the functions of the printing devices 12, 13, 14 and 15, and of the computer 10 shown in FIGS. 8 and 9 realize the process sequence shown in FIG. 5. These functions allow the user to select a printing device to receive the print job when the image forming device 1 finds it impossible to execute the print job. Thus, the print job is executed in the selected printing device capable of producing a printed output that satisfies the user.

Figure 15:
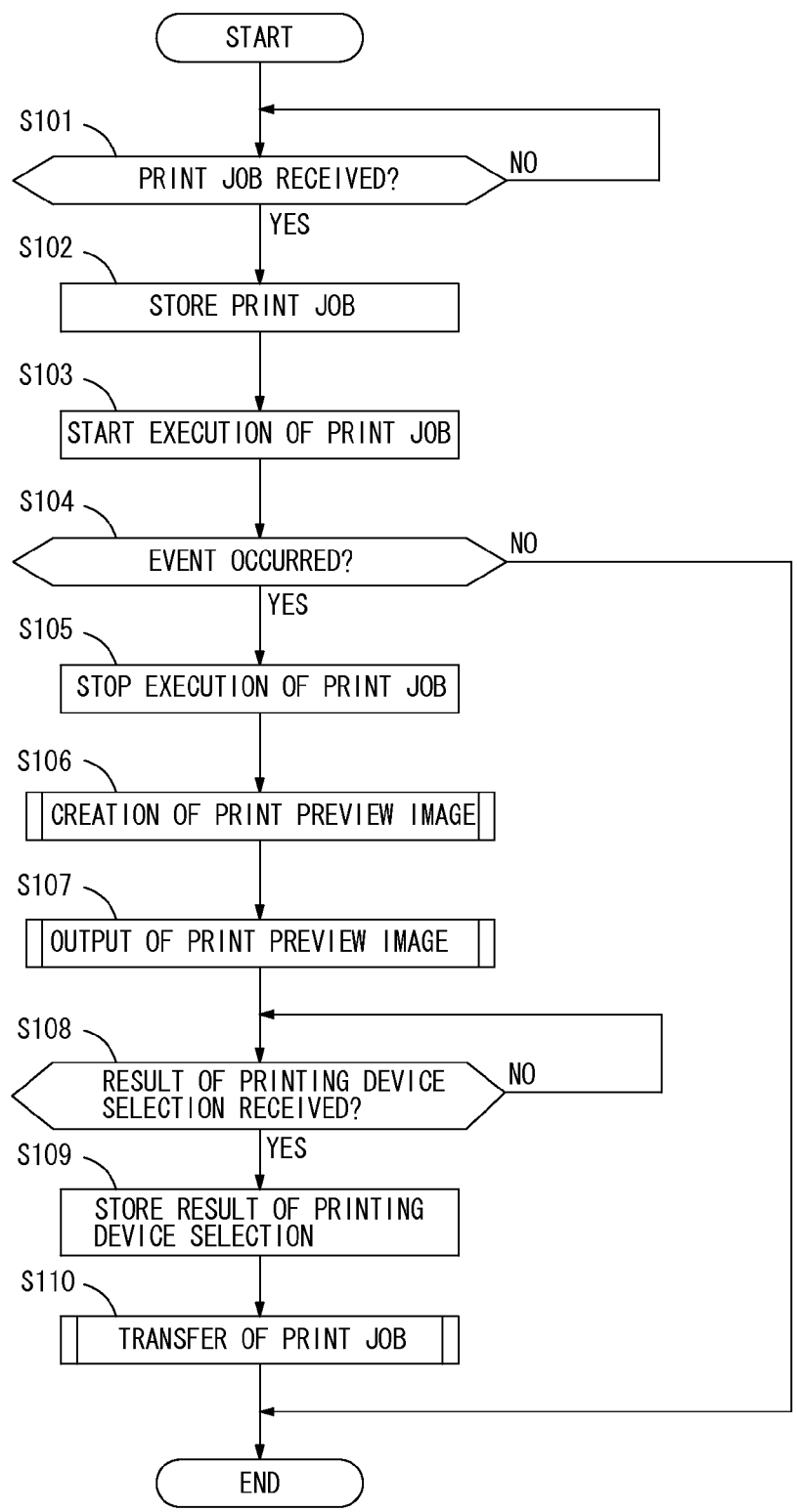
FIG. 15 is a flow diagram explaining an exemplary procedure of the image forming device when the image forming device receives a print job.

The operation of the image forming device 1 is described next. FIG. 15 is a flow diagram explaining an exemplary procedure of the image forming device 1 when the image forming device 1 receives the print job. The image forming device 1 checks to see whether or not the print job is received (step S101). When the image forming device 1 receives the print job (when a result of step S101 is YES), the print job managing part 81 is put into operation to store the received print job to the print job storage part 31 (step S102). Then, the print job managing part 81 reads the print job from the print job storage part 31 at a point in time when execution of the print job becomes feasible, and starts executing the print job (step S103).

When the event detecting part 82 detects occurrence of an event in the image forming device 1 (when a result of step S104 is YES), the print job managing part 81 stops execution of the print job (step S105). Next, the print preview processing part 84 is put into operation to create first and second print preview images (creation of print preview image) (step S106). After the creation, the print preview processing part 84 outputs the first and second print preview images (output of print preview image) (step S107). Thereafter the image forming device 1 is put into a waiting state until a result of printing device selection is received from the computer 10 (step S108). When the result is received (when a result of step S108 is YES), the result managing part 87part 87 is put into operation to store the received result of the printing device selection to the result storage part 33 (step S109). Next, the print job converting part 88 and the print job transferring part 80 are put into operation to transfer the print job (transmission of print job) (step S110). Thereafter, the procedure is completed. When the event detecting part 82 does not detect an event (when a result of step S104 is NO), the image forming device 1 finishes executing the print job, thereby completing the procedure.

Figure 16:
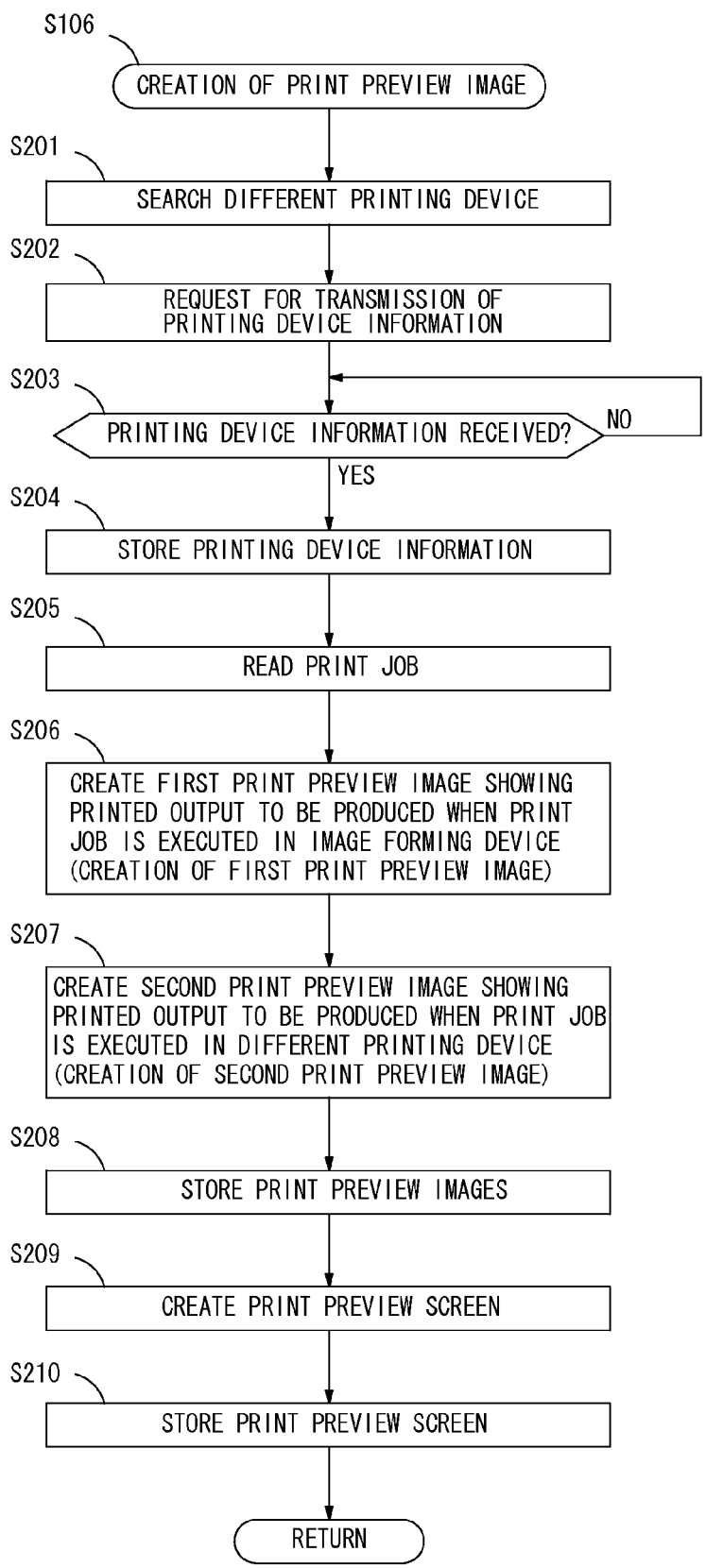
FIG. 16 is a flow diagram explaining in detail an exemplary procedure of creation of print preview image.

FIG. 16 is a flow diagram explaining in detail an exemplary procedure of the creation of print preview image (step S106 of FIG. 15). In the stage of the creation of print preview image, the printing device information managing part 83 is first put into operation to search for the printing devices 12, 13, 14 and 15 connected to the network 9 (step S201). As a result, each printing device in operation is found. Next, the printing device information managing part 83 sends requests for transmission of own printing device information 150 to each of the printing devices 12, 13, 14 and 15 that are found as a result of the search (step S202). Then, the image forming device 1 is put into a waiting state until printing device information 150 is received from each of the printing devices 12, 13, 14 and 15 (step S203). When printing device information 150 is received from each of the printing devices 12, 13, 14 and 15 (when a result of step S203 is YES), the printing device information managing part 83 stores the received printing device information 150 to the printing device information storage part 32 (step S204). Thereafter the print preview image creating section 85 is put into operation in the print preview processing part 84. First, the print preview image creating section 85 reads the print job from the print job managing part 31 (step S205), and creates a first print preview image (step S206). After creating the first print preview image, the print preview image creating section 85 creates second print preview images (step S207). The created first and second print preview images are stored in the print preview image storage unit 35 (step S208).

Next, the print preview screen creating section 86 is put into operation in the print preview processing part 84 to create a print preview screen 120 on which the first and second print preview images stored in the print preview image storage unit 35 are arranged in a predetermined pattern (step S209). Then, the print preview screen creating section 86 stores the created print preview screen 120 to the print preview screen storage part 37 (step S210). Then, the creation of print preview image is completed.

Figure 17:
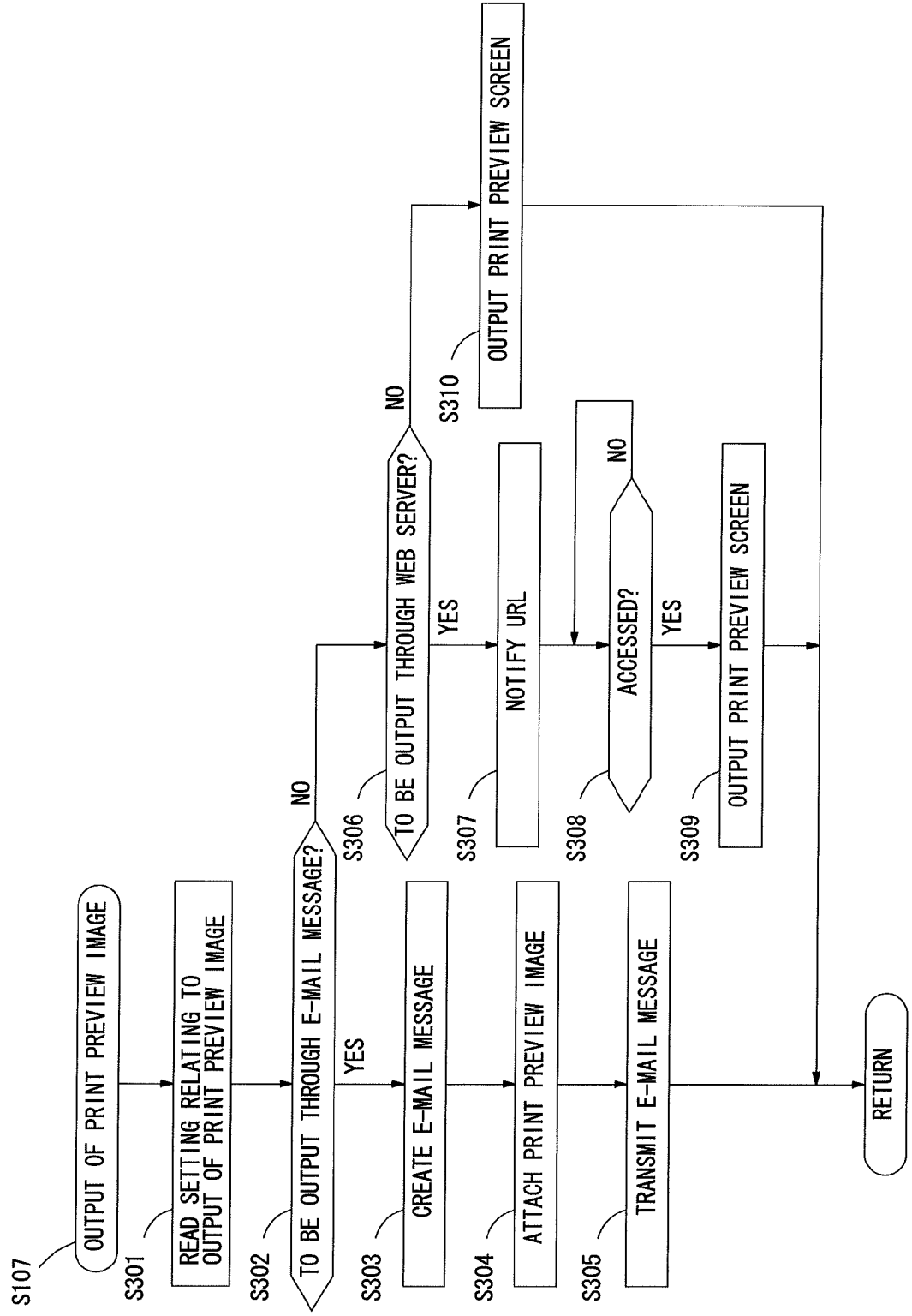
FIG. 17 is a flow diagram explaining in detail an exemplary procedure of output of print preview image.

FIG. 17 is a flow diagram explaining in detail an exemplary procedure of the output of print preview image (step S107 of FIG. 15). In the stage of the output of print preview image, the print preview processing part 84 first reads a setting relating to output of print preview images (more specifically, a setting defining which one of the first to third ways for transmission described above is to be configured) (step S301). When the output through an e-mail message is set (when a result of step S302 is YES), the print preview processing part 84 creates an e-mail message to be transmitted to the computer 10 (step S303). Then, the print preview processing part 84 reads the first and second print preview images from the print preview image storage unit 35, and attaches the read first and second print preview images to the e-mail message (step S304). Next, the print preview processing part 84 transmits the e-mail message to an e-mail address of the computer 10 (step S305), and thereafter completes the procedure.

When the output through a Web server is set (when a result of step S306 is YES), the print preview processing part 84 notifies the computer 10 of a URL through which the computer 10 can access the image forming device 1 (step S307). The URL is displayed, for example, in a pop-up window on the display unit 64 of the computer 10 by the function of the driver program 73 resident in the computer 10. Then, the image forming device 1 is put into a waiting state until the computer 10 accesses the image forming device 1 (step S308). When the computer 10 accesses the image forming device 1, the print preview processing part 84 reads the print preview screen 120 from the print preview screen storage part 37 and outputs the read print preview screen 120 to the computer 10 (step S309), and thereafter completes the procedure.

When a setting of the output is different from those mentioned above (when a result of step S306 is NO), the print preview processing part 84 reads the print preview screen 120 from the print preview screen storage part 37 and outputs the read print preview screen 120 to the computer 10 (step S310). Accordingly, the print preview screen 120 is displayed in a pop-up window on the display unit 64 by the function of the driver program 73 resident in the computer 10. The print preview processing part 84 thereafter completes the procedure. While the print preview screen 120 output in step S309 contains screen data that is different in a strict sense from that of the print preview screen 120 output in step S310, this difference is not mentioned here.

Figure 18:
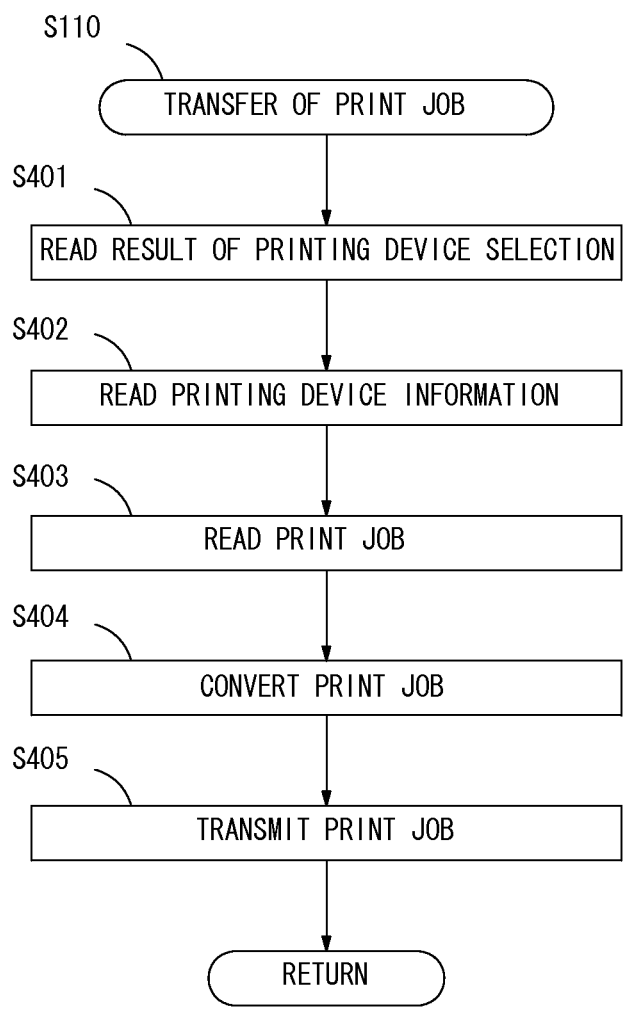
FIG. 18 is a flow diagram explaining in detail an exemplary procedure of transmission of print job.

FIG. 18 is a flow diagram explaining in detail an exemplary procedure of the transmission of the print job (step S110 of FIG. 15). In the stage of the transmission of the print job, the print job converting part 88 is first put into operation to read the result of the printing device selection from the result storage part 33 (step S401). Next, the print job converting part 88 reads printing device information 150 in reference to a printing device designated in response to the result of the printing device selection (step S402). Then, the print job converting part 88 reads the print job stored in step S102 of FIG. 15 from the print job storage part 31 (step S403), and converts the read print job to data in a format that conforms to the printing device selected by the user (step S404). In response, the print job transferring part 80 is put into operation to transmit the converted print job to the printing device designated in response to the result of the printing device selection (step S405). Thereafter the transmission of the print job is completed.

Figure 19:
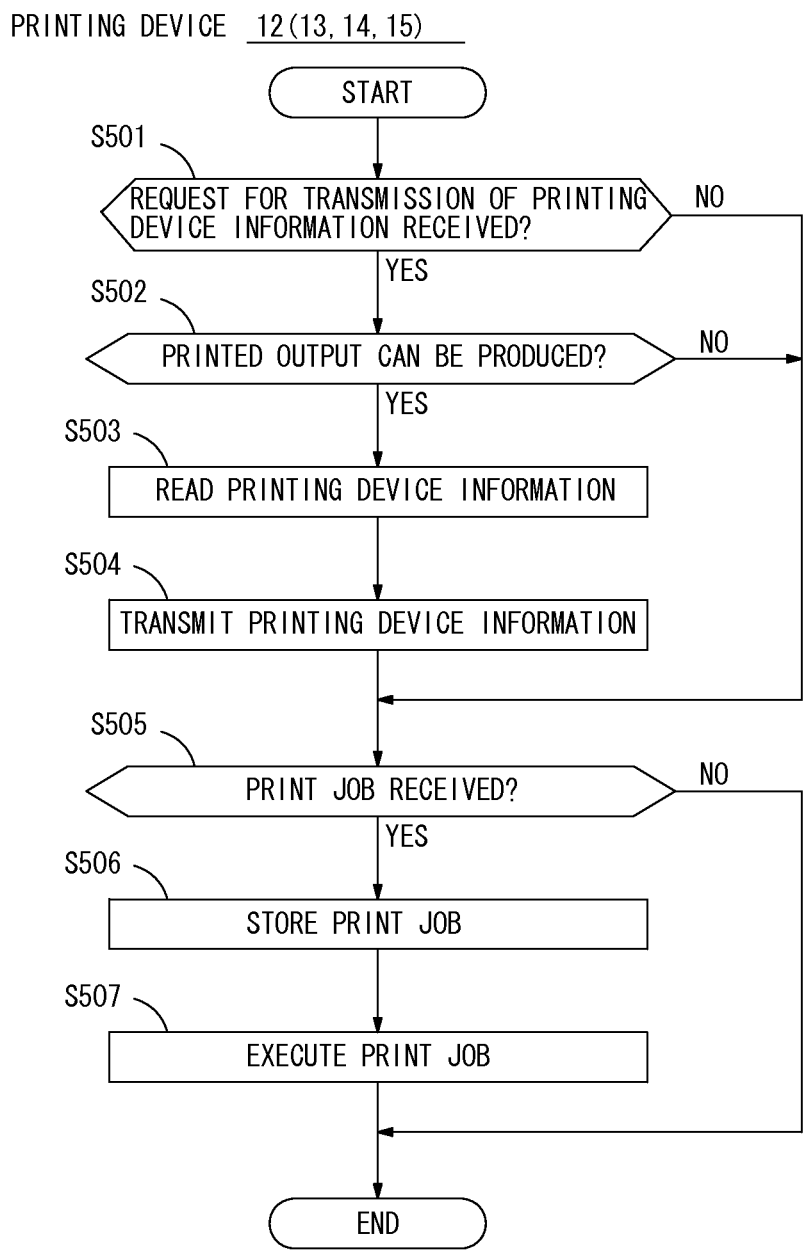
FIG. 19 is a flow diagram explaining an exemplary procedure performed at regular intervals in the printing device.

The operation of each of the printing devices 12, 13, 14 and 15 is described next. FIG. 19 is a flow diagram explaining an exemplary procedure performed at regular intervals in each of the printing devices 12, 13, 14 and 15. The printing device 12, 13, 14 or 15 determines whether or not a request for transmission of printing device information has been received from the image forming device 1 (step S501). When the request for transmission has been received (when a result of step S501 is YES), the printing device 12, 13, 14 or 15 determines whether or not its current state is such that a printed output can be produced therein at present (step S502). When the current state is such that a printed output can be produced therein at present (when a result of step S502 is YES), the printing device information managing part 91 is put into operation to read printing device information 150 from the printing device information storage unit 52 (step S503). Then, the printing device information managing part 91 transmits the read printing device information 150 to the image forming device 1 (step S504). In contrast, when the request for transmission has not been received (when a result of step S501 is NO), or when it is determined that the printing device 12, 13, 14 or 15 is not capable of producing a printed output therein at the time (when a result of step S502 is NO), printing device information 150 is not transmitted to the image forming device 1.

Next, the printing device 12, 13, 14 or 15 determines whether or not the print job has been received from the image forming device 1 (step S505). When the print job has been received (when a result of step S505 is YES), the printing device 12, 13, 14 or 15 stores the print job to the print job storage unit 51 (step S506), and thereafter executes the stored print job (step S507). In contrast, when the print job has not been received (when a result of step S505 is NO), the procedure is completed then.

As described, in the case of occurrence of an event that makes it difficult to execute the received print job in the image forming device 1, the image forming device 1 of the first preferred embodiment creates a first print preview image showing a printed output to be produced when the print job is executed in the image forming device 1. The image forming device 1 also creates respective second print preview images showing printed outputs to be produced when the print job is executed in the printing devices 12, 13, 14 and 15. Then, the image forming device 1 transmits the first and second print preview images to the computer 10 from which the print job has been transmitted. So, by referring to the second print preview images, the user examines the printed outputs to be produced when the print job is executed in the printing devices 12, 13, 14 and 15. For this examination, the user compares the respective second print preview images relating to the printing devices 12, 13, 14 and 15 with the first print preview image showing a printed output to be produced when the same print job is executed in the image forming device 1.

When execution of the print job is made impossible in the image forming device 1 by an event such as an error occurred therein, the image forming device 1 of the first preferred embodiment does not require the user to determine which one of printing devices connected to the network 9 is available. This lightens a burden to be placed on the user when the user makes a different printing device execute the print job instead of the image forming device 1. Further, the image forming device 1 is responsible for creation of second print preview images, namely creation of respective print preview images relating to the printing devices 12, 13, 14 and 15, and conversion of the print job. So, the user is not required to make a prior setting such as installation of the driver program of each of the printing devices 12, 13, 14 and 15 on the computer 10, by which a burden to be placed on the user is also lightened.

In the first preferred embodiment described above, the image forming device 1 transmits the request for transmission of printing device information to each of the printing devices 12, 13, 14 and 15 in order to acquire printing device information 150 from each of the printing devices 12, 13, 14 and 15. However, this is not the only way of acquiring printing device information 150 from each of the printing devices 12, 13, 14 and 15. As an example, each of the printing devices 12, 13, 14 and 15 may transmit own printing device information 150 at regular intervals to the image forming device 1. In this case, the image forming device 1 stores therein the printing device information 150 transmitted at regular intervals from each of the printing devices 12, 13, 14 and 15. Then, in the case of occurrence of an event, the image forming device 1 creates second print preview images based on the printing device information 150 stored in advance therein.

So, in the first preferred embodiment shown as an example of the present invention, the user compares a first print preview image and second print preview images output, for example, from an image forming device when an event including occurrence of an error such as toner shortage and sheet shortage in the image forming device. Thus, the user is allowed to easily designate a printing device that can produce a desirable printed output. This lightens a burden to be placed on the user for obtaining a desirable printed output. Also, the printed output satisfying the user may be provided efficiently. This prevents production of a printed output failing to satisfy the user's desire, so that a produced printed output never goes to waste.

(Second Preferred Embodiment)

A second preferred embodiment of the present invention is described next. The second preferred embodiment differs from the first preferred embodiment in a way of acquiring respective second print preview images showing printed outputs to be produced when a print job is executed in the printing devices 12, 13, 14 and 15.

Figure 20:
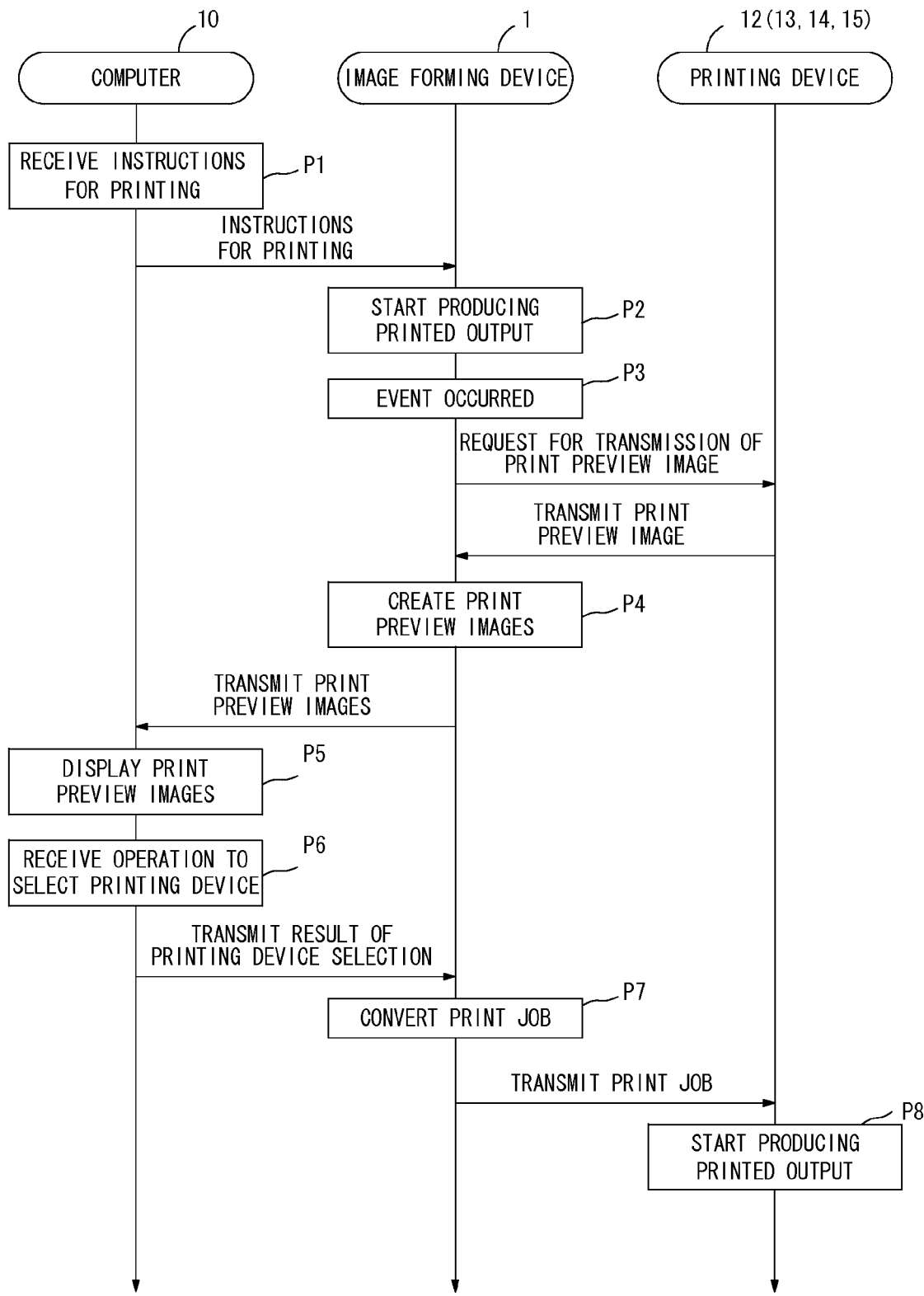
FIG. 20 shows the sequence of processes of a second preferred embodiment of the present invention in order for the image forming device to transfer a print job.

FIG. 20 shows the sequence of processes in order for the image forming device 1 to transfer the print job. Processes P1, P2 and P3 of FIG. 20 are respectively the same as processes P1, P2 and P3 shown in FIG. 5. In the second preferred embodiment, when an event such as an error that makes difficult to continue producing a printed output in the image forming device 1 is occurred therein (process P3), the image forming device 1 stops execution of the print job. Then, the image forming device 1 sends requests to each of the printing devices 12, 13, 14 and 15 connected to the network 9 for transmission of own print preview image. After receiving the request for transmission of a print preview image, the printing devices 12, 13, 14 and 15 each creates own second print preview image showing a printed output to be produced when a print job is executed therein. Then, the printing devices 12, 13, 14 and 15 each transmits the created second print preview image to the image forming device 1.

After receiving the second print preview image from each of the printing devices 12, 13, 14 and 15, the image forming device 1 creates a first print preview image showing a printed output to be produced when the print job is executed in the image forming device 1 (process P4). Then, the image forming device 1 transmits the first and second print preview images to the computer 10. Processes after process S4 are the same as those explained in the first preferred embodiment (see FIG. 5).

The operation of the image forming device 1 for realizing the foregoing processes is described next. In the second preferred embodiment, the image forming device 1 follows the same procedure as that of the first preferred embodiment explained in the flow diagram of FIG. 15, with the exception of creation of print preview image (step S106). The creation of print preview image (step S106) of the second preferred embodiment is described below.

Figure 21:
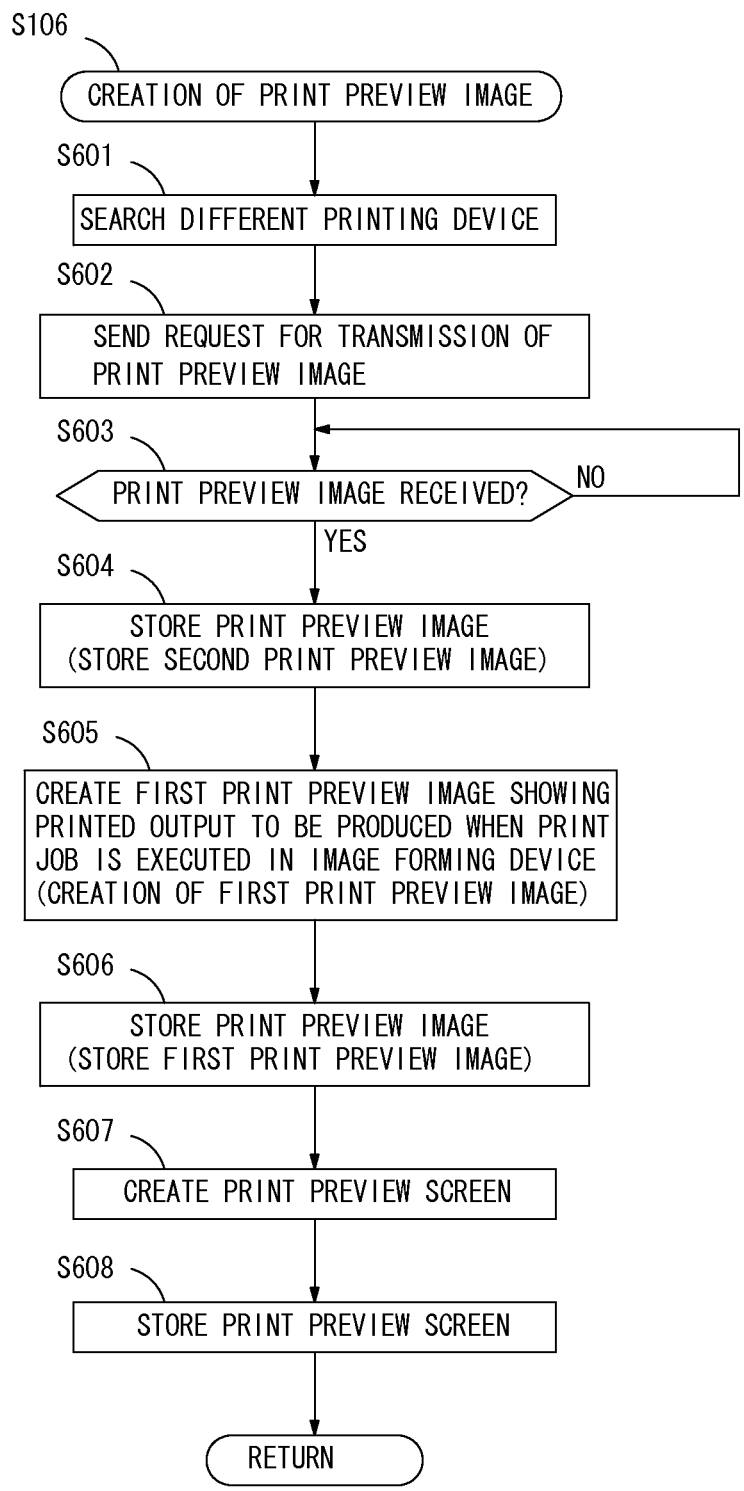
FIG. 21 is a flow diagram explaining in detail an exemplary procedure of creation of print preview image of the second preferred embodiment.

FIG. 21 is a flow diagram explaining in detail an exemplary procedure of the creation of print preview image (step S106 of FIG. 15). In the stage of the creation of print preview image, the printing device information managing part 83 is first put into operation to search for the printing devices 12, 13, 14 and 15 connected to the network 9 (step S601). As a result, each printing device in operation is found. Next, the printing device information managing part 83 sends requests to each of the printing devices 12, 13, 14 and 15 that are found as a result of the search for transmission of own print preview image (step S602). The request transmitted in step S602 includes the print job. So, after receiving the request for transmission of a print preview image, the printing devices 12, 13, 14 and 15 each analyzes the print job included in the request, creates own print preview image showing a printed output to be produced when this print job is executed therein, and transmits the created print preview image to the image forming device 1.

After sending the request for transmission of a print preview image, the image forming device 1 is put into a waiting state until the second print preview image is received from each of the printing devices 12, 13, 14 and 15 (step S603). When the second print preview image is received from each of the printing devices 12, 13, 14 and 15 (when a result of step S603 is YES), the print preview processing part 84 stores the received second print preview images to the print preview image storage unit 35 (step S604). Thereafter the print preview image creating section 85 is put into operation in the print preview processing part 84 to create a first print preview image (step S605). The created first print preview image is also stored to the print preview image storage unit 35 (step S606).

Next, the print preview screen creating section 86 is put into operation in the print preview processing part 84 to create a print preview screen 120 on which the first and second print preview images stored in the print preview image storage unit 35 are arranged in a predetermined pattern (step S607). Then, the print preview screen creating section 86 stores the created print preview screen 120 to the print preview screen storage part 37 (step S608). Then, the creation of print preview image is completed.

As described, in the second preferred embodiment, a second print preview image showing a printed outputs to be produced when the print job is executed in each of the printing devices 12, 13, 14 and 15 is created not in the image forming device 1, but in own printing devices 12, 13, 14 and 15. This eliminates the need for the image forming device 1 to create second print preview images, so that the image forming device 1 is allowed to perform the procedure at enhanced efficiency in the case of occurrence of an event.

(Third Preferred Embodiment)

Figure 22:
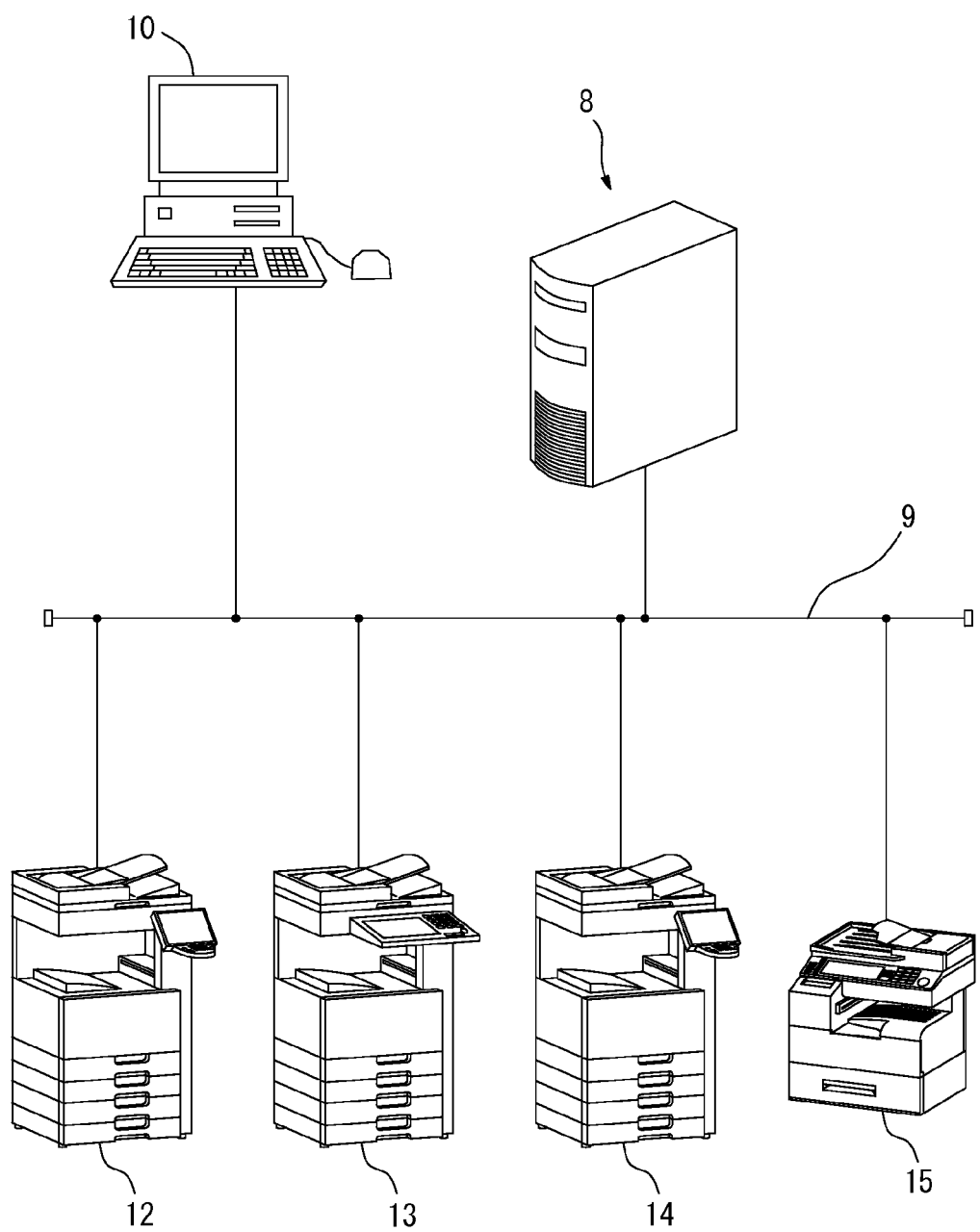
FIG. 22 shows an exemplary configuration of an image forming system of a third preferred embodiment of the present invention.

A third preferred embodiment of the present invention is described next. FIG. 22 shows an exemplary configuration of an image forming system of the third preferred embodiment. The image forming system includes: an information processing device 8 functioning as a print server; the computer 10; and the multiple printing devices 12, 13, 14 and 15. The information processing device 8, the computer 10, and the printing devices 12, 13, 14 and 15 are connected to each other through the network 9 in a manner that allows data communication therebetween. The computer 10, and the printing devices 12, 13, 14 and 15 of the third preferred embodiment each functions in the same manner as that of the corresponding component of the first preferred embodiment.

The information processing device 8 receives a print job transmitted, for example, from the computer 10 through the network 9 and which is created in response to user's instructions for printing, and transmits the received print job to one of the printing devices 12, 13, 14 and 15 designated by the instructions for printing. As an example, when the user designates the printing device 12, the information processing device 8 transmits the print job to the printing device 12 through the network 9.

After receiving the print job from the information processing device 8, the printing device 12 executes the received print job. When an event similar to that mentioned above that makes difficult to execute the print job is occurred during execution of the print job, the printing device 12 notifies the information processing device 8 of the occurrence of the event.

In response, the information processing device 8 performs the same procedure as that of the image forming device 1 described in the first or second preferred embodiment. More specifically, the information processing device 8 detects occurrence of the event in the printing device 12 that makes difficult to produce a printed output therein. When detecting occurrence of the event, the information processing device 8 acquires a first print preview image showing a printed output to be produced when the print job is executed in the printing device 12. The information processing device 8 also acquires respective second print preview images showing printed outputs to be produced when the print job is executed in the printing devices 13, 14 and 15 except for the printing device 12. Then, the information processing device 8 outputs the acquired first and second print preview images to the computer 10. Next, the information processing device 8 causes the user to select a printing device from the printing devices 13, 14 and 15 for execution of the print job instead of the printing device 12, and transfers the print job to the printing device selected by the user.

FIG. 23 shows the sequence of processes of the third preferred embodiment in order for the information processing device 8 to transfer the print job. After instructions for printing from the user are given to the computer 10 (process P10), the computer 10 transmits the instructions for printing to the information processing device 8. The instructions for printing include information in reference to the printing device 12 designated by the user, and the print job.

After receiving the instructions for printing, the information processing device 8 stores the print job contained in the instructions (process P11), and transmits the print job to the printing device 12 designated by the user.

After receiving the print job from the information processing device 8, the printing device 12 starts producing a printed output based on the received print job (process P12). When an event such as an error that makes difficult to continue producing a printed output in the printing device 12 is occurred therein (process P13), the printing device 12 stops execution of the print job, and notifies the information processing device 8 of the occurrence of the event.

The information processing device 8 detects by the notification given from the printing device 12 that the event making execution of the print job difficult in the printing device 12 has been occurred therein (process P14). Then, the information processing device 8 sends requests to the printing device 12, and each of the printing devices 13, 14 and 15 for transmission of own printing device information. In response to the request for transmission of printing device information, the printing devices 12, 13, 14 and 15 each reads own printing device information 150, and transmits the read printing device information 150 to the information processing device 8.

After receiving the printing device information 150 from each of the printing devices 12, 13, 14 and 15, the information processing device 8 creates print preview images showing printed outputs to be produced when the print job is executed in the printing devices 12, 13, 14 and 15 based on the received printing device information 150. To be more specific, the information processing device 8 creates a first print preview image showing a printed output to be produced when the print job is executed in the printing device 12, and respective second print preview images showing printed outputs to be produced when the print job is executed in the printing devices 13, 14 and 15 (process P15). Next, the information processing device 8 transmits the first and second print preview images to the computer 10.

After receiving the first and second print preview images from the information processing device 8, the computer 10 displays the received print preview images on the display unit 64 (process P16), and then receives a user's operation to select a printing device (process P17). When the user selects one printing device that can produce a printed output with the condition which satisfies the user, the computer 10 transmits a result of the user's printing device selection to the information processing device 8.

After receiving the result of the printing device selection from the computer 10, the information processing device 8 designates the printing device selected from among the printing devices 13, 14 and 15 except for the printing device 12 as a destination of transfer of the print job, and converts the print job to data in a format practicable for executing the print job in the designated printing device (process P18). The information processing device 8 thereafter transfers the print job to the printing device designated as a destination of transfer of the print job.

The designated printing device received the print job transferred from the information processing device 8 executes the print job to start producing a printed output (process P19). This causes a printing device different from the printing device 12 to execute the print job the execution of which has been difficult to be made in the printing device 12 instead of the printing device 12. The printing device that executes the print job at this time is selected from the printing devices 13, 14 and 15 by the user as a printing device capable of producing a printed output with the condition satisfies the user. So, a printed output to be produced by this printing device never goes to waste.

In the third preferred embodiment described above, the information processing device 8 creates both first and second print preview images. Alternatively, the printing devices 12, 13, 14 and 15 each may create own print preview image in response to the request for transmission of a print preview image given from the information device 8 to each of the printing devices 12, 13, 14 and 15.

(Modifications)

While the preferred embodiments of the present invention have been described above, the present invention is not intended to be limited to the details shown above. Numerous modifications and variations can be devised without departing from the scope of the invention.

As an example, an event detected by the image forming device 1 or by the information processing device 8 is such that makes execution of a print job difficult. However, this is not always this type of the event.

Further, the image forming device 1 described above can execute a print job also when the instructions to execute the print job are given by a user by operating the operational panel 4. So, in this case, the image forming device 1 can output created first and second print preview images to the display section 4a of the operational panel 4.

In the above-described preferred embodiments, it is assumed that the image forming device 1 returns to a state where the image forming device 1 can execute a print job, for example after an event is occurred in the image forming device 1, and the printing device information 150 is received from each of the printing devices 12, 13, 14 and 15. In this case, the image forming device 1 may execute the print job without transferring the print job.

In the above-described preferred embodiments, in each stage of the creation of print preview image, the image forming device 1 or the information processing device 8 sends a request for transmission of printing device information every time the print preview image is created. Alternatively, once printing device information 150 is received, the image forming device 1 or the information processing device 8 may stop sending a new request for a certain period of time after receipt of the printing device information 150. In this case, the image forming device 1 or the information processing device 8 may create a second print preview image based on the previously received printing device information 150 before the elapse of the certain period of time.

In the above-described preferred embodiments, a print preview screen 120 is created only in the image forming device 1. A print preview screen 120 may alternatively be created by the computer 10 when the setting is configured to display the print preview screen 120 by the function of the driver program 73 resident in the computer 10.

What is claimed is:

1. An image forming device capable of making data communication with at least one printing device through a network, the image forming device comprising:
    a print job acquiring part for acquiring a print job created in response to user's instructions for printing;
    an image forming part for producing a printed output by executing said print job;
    an event detecting part for detecting occurrence of an event; and
    a print preview processing part for acquiring a first print preview image showing a printed output to be produced when said print job is executed in said image forming part, and a second print preview image showing a printed output to be produced when said print job is executed in said at least one printing device, and for outputting said first and second print preview images, said print preview processing part acquiring and outputting said first and second print preview images when said event detecting part detects occurrence of said event,
    wherein said event is an event that prevents production of a printed output in the image forming part.

2. The image forming device according to claim 1, wherein multiple printing devices are connected to said network, and
    when said event detecting part detects occurrence of said event, said print preview processing part acquires respective second print preview images showing printed outputs to be produced when said print job is executed in said multiple printing devices, and outputs said first print preview image and said respective second print preview images.

3. The image forming device according to claim 2, further comprising a print job transferring part for receiving instructions to transfer said print job designating a printing device selected from among said multiple printing devices after said print preview processing part outputs said first and second print preview images, and transferring said print job to the designated printing device.

4. The image forming device according to claim 1, wherein said print preview processing part includes a print preview image creating part, and
    when said event detecting part detects occurrence of said event, said print preview image creating part creates said first print preview image showing a printed output to be produced when said print job is executed in said image forming part, and said second print preview image showing a printed output to be produced when said print job is executed in said at least one printing device.

5. The image forming device according to claim 4, further comprising a printing device information acquiring part for acquiring printing device information containing a print setting that can be selected when said at least one printing device produces a printed output, wherein
    said print preview image creating part creates said second print preview image based on said printing device information.

6. The image forming device according to claim 5, further comprising a storage part in which said printing device information acquired by said printing device information acquiring part is stored, wherein
    when said event detecting part detects occurrence of said event, said print preview image creating part creates said second print preview image based on said printing device information acquired and stored in advance in said storage part by said printing device information acquiring part.

7. The image forming device according to claim 1, wherein when said event detecting part detects occurrence of said event, said print preview processing part sends a request to said at least one printing device to create said second print preview image showing a printed output to be produced when said print job is executed in said at least one printing device, and acquires said second print preview image created by said at least one printing device.

8. The image forming device according to claim 1, wherein said print preview processing part further includes a print preview screen creating part, and
said print preview screen creating part creates a screen on which said first and second print preview images are arranged in a predetermined pattern.

9. The image forming device according to claim 8, wherein multiple printing devices are connected to said network, and
when respective second print preview images corresponding to said multiple printing devices are acquired, said print preview screen creating part arranges said respective second print preview images in descending order of frequency of use of said multiple printing devices, in a manner that a second print preview image corresponding to a printing device with a highest frequency of use is arranged closest to said first print preview image, thereby creating said screen.

10. The image forming device according to claim 8, wherein
multiple printing devices are connected to said network, and
when respective second print preview images corresponding to said multiple printing devices are acquired, said print preview screen creating part compares each of said respective second print preview images with said first print preview image, and arranges said respective second print preview images in ascending order of difference from said first print preview image, in a manner that a second print preview image corresponding to a printing device with a smallest number of differences is arranged closest to said first print preview image, thereby creating said screen.

11. The image forming device according to claim 10, wherein
said print preview screen creating part highlights a portion of each of said respective second print preview images that is not found in said first print preview image, thereby creating said screen.

12. The image forming device according to claim 10, wherein
said print preview screen creating part extracts only a portion of each of said respective second print preview images that is not found in said first print preview image, thereby creating said screen.

13. The image forming device according to claim 10, wherein
said first print preview image and said respective second print preview images are in the form of image data obtained by rasterizing data contained in said print job when said print preview screen creating part compares each of said respective second print preview images with said first print preview image.

14. The image forming device according to claim 10, wherein said difference comprises a difference in fonts, a difference in colors, a difference in fonts and colors, or a difference in printing costs, between respective second print preview images and said first print preview image.

15. The image forming device according to claim 1, wherein said event is toner shortage, sheet shortage, stapler shortage or account balance shortage.

16. An information processing device connected through a network to multiple printing devices in a manner that allows data communication therebetween, the information processing device receiving a print job created in response to user's instructions for printing, and transmitting said print job to a printing device selected from among said multiple printing devices and designated by said instructions for printing, the information processing device comprising:
an event detecting part for detecting occurrence of an event that makes production of a printed output difficult in the designated printing device; and
a print preview processing part for acquiring a first print preview image showing a printed output to be produced when said print job is executed in said designated printing device, and a second print preview image showing a printed output to be produced when said print job is executed in at least one printing device different from said designated printing device, and for outputting said first and second print preview images, said print preview processing part acquiring and outputting said first and second print preview images when said event detecting part detects occurrence of said event,
wherein said event is an event that prevents production of a printed output in the designated printing device.

17. The information processing device according to claim 16, further comprising a print job transmitting part, wherein
the at least one different printing device includes multiple different printing devices, and
after said print preview processing part outputs said first and second print preview images, said print job transferring part receives instructions to transfer said print job designating a printing device selected from among said multiple different printing devices, and transfers said print job to the designated printing device selected from said multiple different printing devices.

18. A print preview processing method employed in an image forming device capable of making data communication with at least one printing device through a network, the method comprising the steps of:
(a) acquiring a print job created in response to user's instructions for printing;
(b) detecting occurrence of an event in said image forming device;
(c) acquiring a first print preview image showing a printed output to be produced when said print job is executed in said image forming device, and a second print preview image showing a printed output to be produced when said print job is executed in said at least one printing device; and
(d) outputting said first and second print preview images when the occurrence of an evnt is detected,
wherein said event is an event that prevents production of a printed output in the image forming part.

19. The print preview processing method according to claim 18, further comprising the step of:
receiving instructions to transfer said print job to a designated printing device selected from said at least one printing device after said first and second print preview images are output, and transferring said print job to the designated printing device.

20. A print preview processing method employed in an image forming system in which multiple printing devices are connected through a network in a manner that allows data communication therebetween, the image forming system receiving a print job created in response to user's instructions for printing, and transmitting said print job to a printing device selected from said multiple printing devices and designated by said instructions for printing, the method comprising the steps of:

(a) detecting occurrence of an event in the designated printing device, said event making production of a printed output difficult in said designated printing device;

(b) acquiring a first print preview image showing a printed output to be produced when said print job is executed in said designated printing device, and a second print preview image showing a printed output to be produced when said print job is executed in at least one printing device different from said designated printing device when occurrence of said event is detected; and (d) outputting said first and second print preview images when the occurrence of an event is detected, wherein said event is an event that prevents production of a printed output in the designated printing device.

21. The print preview processing method according to claim 20, further comprising the step of:

receiving instructions to transfer said print job to a designated printing device selected from said at least one printing device after said first and second print preview images are output, and transferring said print job to the designated printing device.

* * * * *